US012293571B2

United States Patent
Iwaki et al.

(10) Patent No.: US 12,293,571 B2
(45) Date of Patent: May 6, 2025

(54) IMAGE PROCESSING SYSTEM, IMAGE PROCESSING DEVICE, ENDOSCOPE SYSTEM, INTERFACE, IMAGE PROCESSING METHOD AND INFORMATION STORAGE MEDIUM

(71) Applicant: OLYMPUS CORPORATION, Tokyo (JP)

(72) Inventors: Hidekazu Iwaki, Hachioji (JP); Taisei Kondo, Sapporo (JP)

(73) Assignee: OLYMPUS CORPORATION, Tokyo (JP)

( * ) Notice: Subject to any disclaimer, the term of this patent is extended or adjusted under 35 U.S.C. 154(b) by 432 days.

(21) Appl. No.: 17/842,952

(22) Filed: Jun. 17, 2022

(65) Prior Publication Data
US 2022/0319153 A1 Oct. 6, 2022

Related U.S. Application Data

(63) Continuation of application No. PCT/JP2020/010293, filed on Mar. 10, 2020.

(51) Int. Cl.
*G06T 7/73* (2017.01)
*G06T 7/00* (2017.01)
*G06V 10/774* (2022.01)

(52) U.S. Cl.
CPC .......... *G06V 10/774* (2022.01); *G06T 7/0012* (2013.01); *G06T 2207/10068* (2013.01);
(Continued)

(58) Field of Classification Search
CPC ... G06T 7/194; G06T 7/11; G06T 7/90; G06T 3/40; G06T 7/00; G06T 7/20; G06T 7/73;
(Continued)

(56) References Cited

U.S. PATENT DOCUMENTS

2017/0364810 A1* 12/2017 Gusev ..................... G06F 17/18
2018/0181885 A1    6/2018 Higo et al.
(Continued)

FOREIGN PATENT DOCUMENTS

CN    107134184 A  *  9/2017  ............... G09B 5/08
CN    109670494 A  *  4/2019
(Continued)

OTHER PUBLICATIONS

Tomoki Abiko, Yasue Kishino, and Yoshinari Shirai, "A Study of Interaction-based Labeling Confidence Rating Estimation Method for Gradual Update of Discriminative Model", The Technical Reports of Information Processing Society of Japan, Japan, Information Processing Society of Japan, Jan. 8, 2020, vol. 2020-HCI-186, No. 8, pp. 1-8, ISSN 2188-8760.
(Continued)

*Primary Examiner* — Quan M Hua
(74) *Attorney, Agent, or Firm* — Scully, Scott, Murphy & Presser, P.C.

(57) ABSTRACT

An image processing system includes an interface to which an annotation result on a learning image captured inside a living body is input and a processor including hardware. The processor acquires metadata including difficulty information indicating difficulty of the annotation of the learning image itself, determines reliability information indicating reliability of the annotation result based on the metadata, and outputs a dataset in which the learning image, the annotation result, and the reliability information are associated with each other, as data used in generating a trained model used in inference based on deep learning on an inference target image captured inside a living body.

20 Claims, 11 Drawing Sheets

(52) U.S. Cl.
CPC .............. *G06T 2207/20081* (2013.01); *G06T 2207/20092* (2013.01); *G06T 2207/30004* (2013.01); *G06V 2201/03* (2022.01); *G06V 2201/10* (2022.01)

(58) Field of Classification Search
CPC .......... G06T 11/00; G06T 7/10; G06T 11/60; G06V 10/82; G06V 10/774; G06V 10/764; G06V 10/776; G06V 20/40; G06V 20/69; G06V 10/26; G06V 10/94; G06V 20/58; G06V 20/52; G06N 3/04; G06N 20/00; G06N 3/08
See application file for complete search history.

(56) References Cited

U.S. PATENT DOCUMENTS

| | | |
|---|---|---|
| 2018/0276500 A1 | 9/2018 | Yamada et al. |
| 2019/0065996 A1 | 2/2019 | Matsuki |
| 2019/0340541 A1 | 11/2019 | Watson et al. |

FOREIGN PATENT DOCUMENTS

| | | |
|---|---|---|
| JP | 2009110064 A | 5/2009 |
| JP | 2009282686 A | 12/2009 |
| JP | 2017211689 A | 11/2017 |
| JP | 2018-106662 A | 7/2018 |
| JP | 2018-163554 A | 10/2018 |
| JP | 2019-046058 A | 3/2019 |
| JP | 2019101559 A | 6/2019 |
| JP | 2020035095 A | 3/2020 |
| WO | 2019/211706 A1 | 11/2019 |

OTHER PUBLICATIONS

Japanese Office Action dated Aug. 22, 2023.
Oyama, Satoshi, p. 29, left column, "2.3 Allowing Workers to Self-Report Their Own Work Quality", and p. 30, "3.2 Weighting Votes for Worker Ability", Quality Management in Human Computation, Journal of the Japanese Society for Artificial Intelligence (Jan. 2014), vol. 29, No. 1 (No. 163 overall), pp. 27-33, ISSN: 2188-2266, cited in ISR.
International Search Report dated Jun. 30, 2020 issued in PCT/JP2020/010293.

* cited by examiner

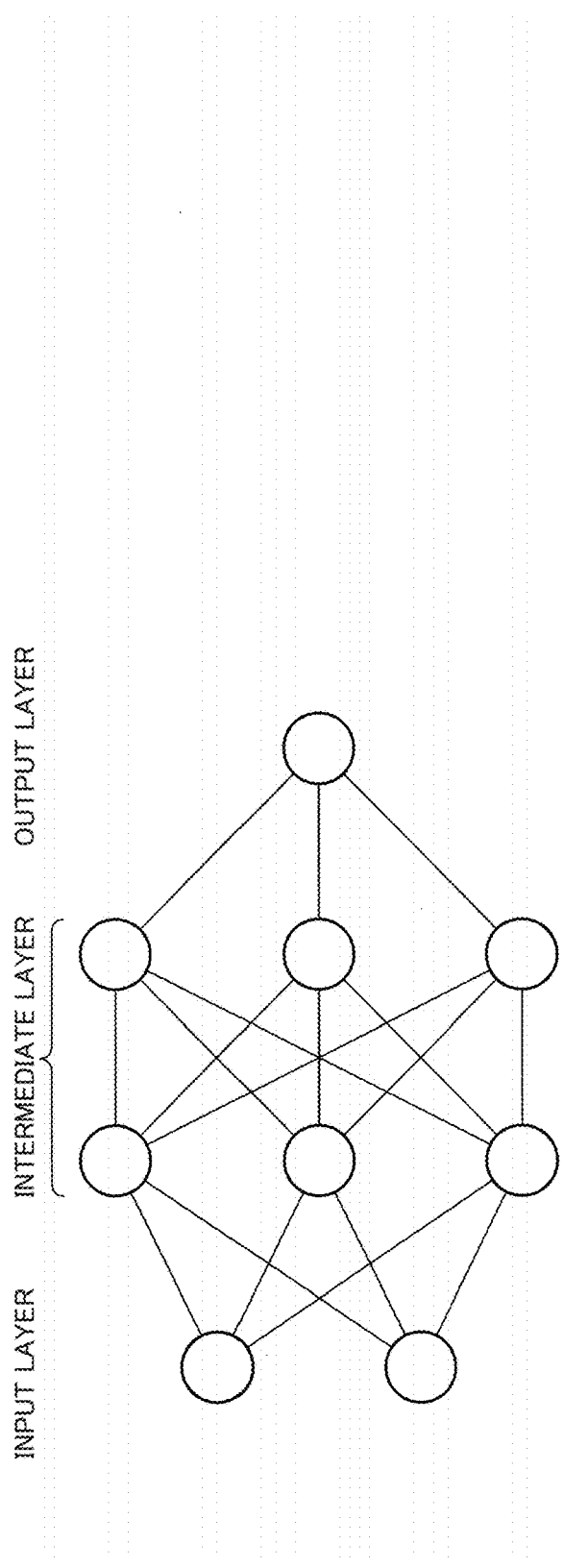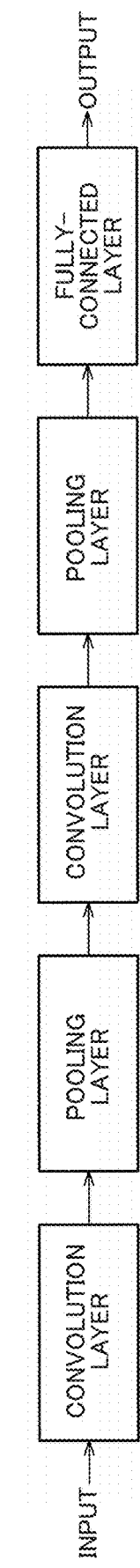

IMAGE PROCESSING SYSTEM, IMAGE PROCESSING DEVICE, ENDOSCOPE SYSTEM, INTERFACE, IMAGE PROCESSING METHOD AND INFORMATION STORAGE MEDIUM

CROSS REFERENCE TO RELATED APPLICATION

This application is a continuation of International Patent Application No. PCT/JP2020/010293, having an international filing date of Mar. 10, 2020, which designated the United States, the entirety of which is incorporated herein by reference.

BACKGROUND

Heretofore, methods of applying deep learning to image processing on living body images have been known. In deep learning, teacher data with correct annotation is required. In order to perform accurate annotation, knowledge and experience regarding the domain from which the data was obtained are essential.

Japanese Unexamined Patent Application Publication No. 2009-282686 proposes a method for performing accurate learning for classification models by adding reliability to annotation data created by non-experts and using the reliability for learning. In the method of Japanese Unexamined Patent Application Publication No. 2009-282686, reliability is added to annotations created by non-experts based on annotation data created by experts.

SUMMARY

In accordance with one of some aspect, there is provided an image processing system comprising: an interface to which an annotation result on a learning image captured inside a living body is input; and a processor including hardware, wherein the processor acquires metadata including difficulty information indicating difficulty of annotation of the learning image itself, determines reliability information indicating reliability of the annotation result based on the metadata, and outputs, as data used in generating a trained model used in inference based on deep learning on an inference target image captured inside a living body, a dataset in which the learning image, the annotation result, and the reliability information are associated with each other.

In accordance with one of some aspect, there is provided an image processing device comprising: an interface to which an annotation result on a learning image captured inside a living body is input; and a processor including hardware, wherein the processor acquires metadata including difficulty information indicating difficulty of annotation of the learning image itself, and outputs the acquired metadata as information for determining reliability of the annotation result in association with the learning image, the learning image and the annotation result being used in generating a trained model used in inference based on deep learning on an inference target image captured inside a living body, and the reliability being used as weight information of an objective function in the deep learning.

In accordance with one of some aspect, there is provided an endoscope system comprising: an imaging device that outputs an inference target image by capturing an image of a living body, and a processor including hardware, the processor performing an inference process on the inference target image based on a trained model trained by deep learning, the trained model being trained based on a dataset in which a learning image captured inside a living body, an annotation result on the learning image, and reliability information indicating reliability of the annotation result determined based on metadata given to the learning image are associated with each other, and the metadata including difficulty information indicating difficulty of annotation of the learning image, the learning image and the annotation result being teacher data in the deep learning, and the reliability information being weight information of an objective function in the deep learning.

In accordance with one of some aspect, there is provided an interface comprising: an input section to which an annotation result on a learning image captured inside a living body is input, the interface being connected to a processor including hardware, the interface being used to input, to the processor, metadata including difficulty information indicating difficulty of annotation of the learning image itself, the processor determining reliability information indicating reliability of the annotation result based on the metadata, and the processor outputting, as data used in generating a trained model used in inference based on deep learning on an inference target image captured inside a living body, a dataset in which the learning image, the annotation result, and the reliability information are associated with each other.

In accordance with one of some aspect, there is provided an image processing method comprising: acquiring an annotation result on a learning image captured inside a living body, acquiring metadata including difficulty information indicating difficulty of annotation of the learning image itself, determining reliability information indicating reliability of the annotation result based on the metadata, and outputting, as data used in generating a trained model used in inference based on deep learning on an inference target image captured inside a living body, a dataset in which the learning image, the annotation result, and the reliability information are associated with each other.

In accordance with one of some aspect, there is provided a non-transitory information storage medium storing a program, the program causing a computer to execute steps of: acquiring an annotation result on a learning image captured inside a living body, acquiring metadata including difficulty information indicating difficulty of annotation of the learning image itself, determining reliability information indicating reliability of the annotation result based on the metadata, and outputting, as data used in generating a trained model used in inference based on deep learning on an inference target image captured inside a living body, a dataset in which the learning image, the annotation result, and the reliability information are associated with each other.

BRIEF DESCRIPTION OF DRAWINGS

FIGS. 11A and 11B are explanatory views of a neural network.

DESCRIPTION OF EMBODIMENTS

Figure 1:
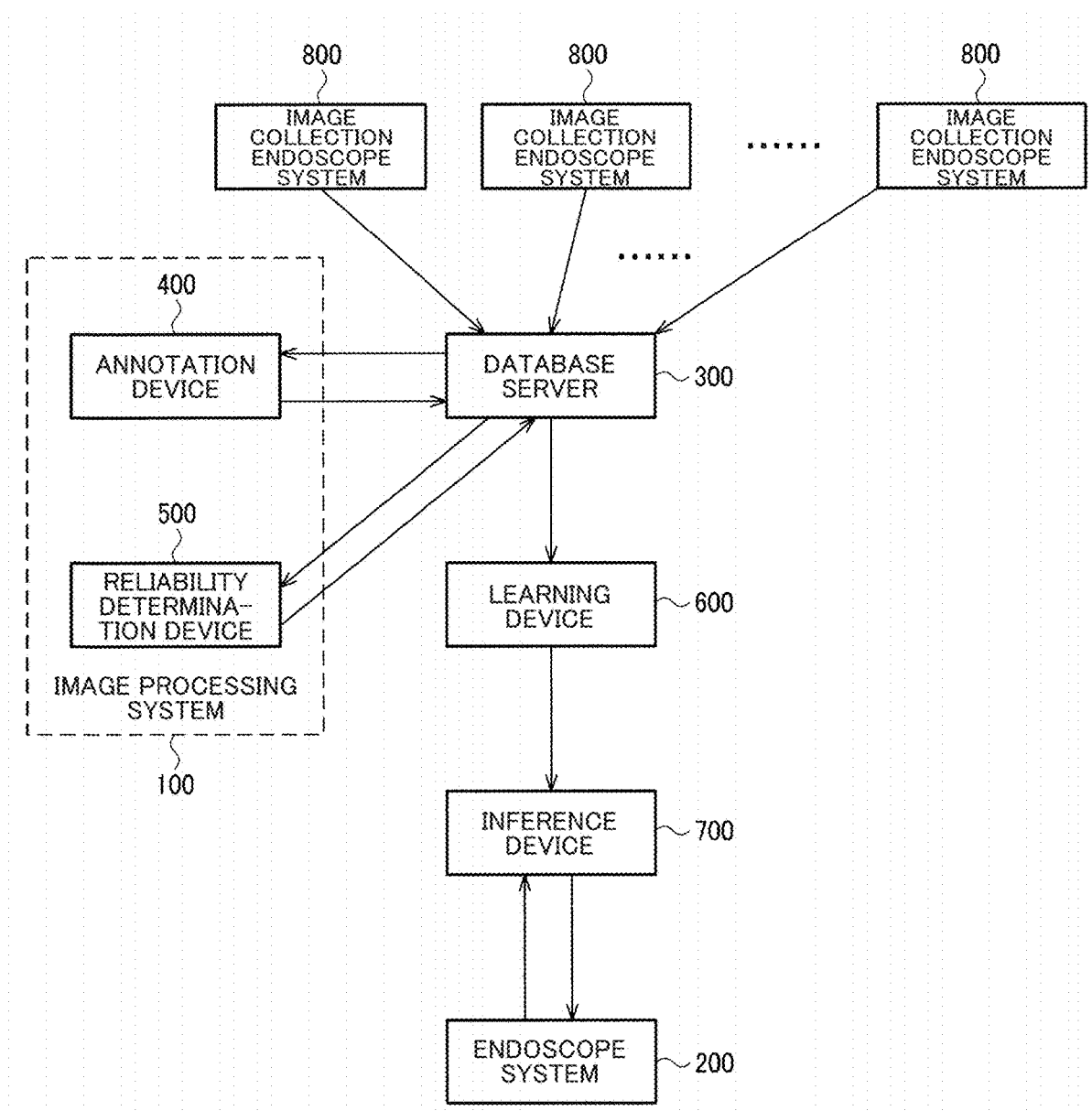
FIG. 1 is a configuration example of a system including an image processing system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Method According to the Present Embodiment

Deep learning is a machine learning technique used for classification and regression problems. In classification problems, a classification model is constructed by learning pre-annotated teacher data. This learning method is generally referred to as supervised learning. Annotation means assigning an associated tag(s) to a given item of data.

Supervised learning requires teacher data that enables a computer to learn. The teacher data must have correct annotations corresponding to the data to be learned by the computer. More specifically, the computer learns how to classify input data based on the teacher data, which enables it to infer a classification result for unknown input data.

This brings up some issues regarding annotation in the creation of teacher data. In order to perform learning using given data as teacher data, correct annotation is necessary. However, for accurate annotation, knowledge and experience regarding the domain from which the data was obtained are essential. For example, when annotation is performed with respect to an image of a living body captured by an endoscope system, experience in diagnosis and treatment using an endoscope system and experience of annotation with respect to images of living body are essential. In the creation of teacher data, in addition to capability for accurate annotation, it is also important to avoid differences between users who perform annotation.

However, since living body images have relatively small differences in feature compared to general images, and also there are many variations in normality due to large individual differences, annotations are often inconsistent even between expert physicians. This may result in accumulation of teacher data containing disparate annotation data.

For example, the following assumes machine learning for generating a classifier for classifying medical images obtained by capturing living bodies using an endoscope system or a detector for detecting a given object from medical images. The classifier herein means a trained model that performs a process of, for example, classifying medical images into "lesion images" showing lesions and "normal images" without lesions. The detector is also a trained model that performs a process of, for example, detecting a lesion from medical images. When teacher data is created to generate these trained models, physicians perform annotation of medical images. However, medical images often have "unrecognizable regions" between normal and lesion regions; therefore, the annotation results vary even between experts. One of the causes of nonnegligible occurrence of "unrecognizable region" described above in living body images is large variation in normality due to changes over time and individual differences.

In general deep learning, information regarding reliability of teacher data or a method for acquiring teacher data is not used for learning. Therefore, all items of teacher data are treated in the same way and equally used for learning, even in situations where incorrect annotations and correct annotations are mixed. When learning is performed with respect to living body images, if all items of teacher data are equally used for the learning as in the previously-known methods, incorrect annotation data may affect the learning, thereby failing to construct an accurate trained model. It is also possible that annotation data of such an "unrecognizable region" in a medical image is discarded and not used for the learning.

Japanese Unexamined Patent Application Publication No. 2009-282686 proposes a method for performing accurate learning for classification models by adding reliability to annotation data created by non-experts and using it for learning. This method adds reliability to annotations created by non-experts based on annotation data created by experts during the learning for a classification model, and reflects the reliability in the learning for the classification model. The reliability is obtained by searching for expert data in the vicinity of the selected non-expert data, calculating the same-label probability, and applying it to the reliability function.

However, the previously-known methods, such as the method disclosed in Japanese Unexamined Patent Application Publication No. 2009-282686, rely on acquisition of expert data with high annotation accuracy. Therefore, the previously-known methods cannot be applied to some cases like living body images in which the annotation results vary even when annotations are made by expert physicians. This has been making it difficult to construct a trained model for living body images with desirable inference accuracy.

Therefore, the method of the present embodiment obtains metadata including difficulty information, which indicates difficulty of performing annotation on living body images, and determines reliability information, which indicates reliability of the annotation result, based on the metadata. Although an annotation result is also metadata given to a learning image in a broad sense, the metadata in the present embodiment refers to data used to determine the reliability of the annotation result. That is, an annotation result and metadata, which is different from the annotation result, are associated with each other with respect to the learning image.

The method of the present embodiment makes it possible to generate teacher data associated with appropriate reliability even when the learning is performed with respect to living body images, for which highly accurate expert data cannot be easily obtained, thereby constructing a trained model with desirable inference accuracy. In other words, since this method is capable of determining absolute reliability for a single user without calculating a relative reliability through a comparison between users, an appropriate reliability can be determined even when expert data with sufficiently high accuracy is absent. The method of the present embodiment also makes it possible to perform a highly accurate learning process using data in which the regions between normal regions and lesion regions are annotated. The regions between normal regions and lesion regions include, for example, a boundary of a lesion, which is useful for lesion detection or the like. Thus, using such a region for the learning process is highly advantageous.

2. System Configuration Example

First, the configuration of the overall system, including an image processing system 100, is described, followed by a description of the detailed configuration of the image processing system 100 and the configuration of an endoscope system 200.

2.1 Entire Configuration Example

FIG. 1 is a configuration example of a system including the image processing system 100 according to the present embodiment. As shown in FIG. 1 the system includes the endoscope system 200, a database server 300, an annotation device 400, a reliability determination device 500, a learning device 600, an inference device 700, and an image collection endoscope system 800. The image processing system 100 corresponds, for example, to the annotation device 400 and the reliability determination device 500. However, the system is not limited to the configuration shown in FIG. 1, and can be modified in various ways including omitting some of its components or adding other components.

The image collection endoscope system 800 captures a plurality of living body images to create a trained model. In response, the endoscope system 200 captures an image of an inference target, which is the subject of the inference process using the trained model. In a narrow sense, the endoscope system 200 is, but not limited to, a system that is performing a diagnosis or treatment on a patient. The inference target image captured by the endoscope system 200 can be used as a part of teacher data in the update of the trained model. That is, the endoscope system 200 may function as the image collection endoscope system 800 at other times. The image collection endoscope system 800 may also serve as the endoscope system 200 for capturing inference target images at other times.

The database server 300 may be provided on a private network such as an intranet, or on a public communication network such as the Internet. The database server 300 may be implemented by cloud computing, and its specific form can be modified in various ways. For example, the database server 300 may be a single physical server or may be implemented by distributed processes of a plurality of physical servers. The database server 300 first collects learning images, which are living body images captured during past diagnoses and treatments, from the image collection endoscope system 800.

The annotation device 400 obtains a learning image from the database server 300 and associates an annotation result with the learning image. Specifically, the annotation device 400 includes an interface for accepting annotations from users. The annotation device 400 also acquires metadata that is used to calculate reliability of annotation results. The annotation device 400 transmits data in which the learning image is associated with the annotation result and the metadata to the database server 300.

The reliability determination device 500 acquires the metadata and determines reliability information, which indicates the reliability of the annotation result, based on the metadata. The database server 300 stores data in which the learning image is associated with the annotation result and the reliability information.

The learning device 600 generates a trained model by performing machine learning based on learning images, annotation results and reliability information. A trained model is specifically a model that performs an inference process according to deep learning. The learning device 600 transmits the generated trained model to the database server 300.

The inference device 700 acquires the trained model generated by the learning device 600. The inference device 700 acquires a living body image captured by an imaging section of the endoscope system 200 as an inference target image. The imaging section corresponds specifically to an image sensor 212 described later. The inference device 700 performs an inference process with respect to the inference target image by acting in accordance with instructions from the trained model. For example, the inference device 700 performs a process of classifying the inference target images or a process of detecting a region of interest from the inference target images.

FIG. 1 shows an example in which the annotation device 400 and the reliability determination device 500 function as an interface for acquiring information stored in the database server 300, performing processing on the acquired information, and transmitting the processing results to the database server 300. However, the database server 300 may be omitted. For example, the annotation device 400 may transmit the learning image, the annotation result and the metadata to the reliability determination device 500 without making them pass through the database server 300. The reliability determination device 500 may transmit the learning image, the annotation result and the reliability information to the learning device 600 without making them pass through the database server 300.

The devices shown in FIG. 1 are not limited to those provided as separate units, but may be multiple devices integrated as a single unit. For example, the annotation device 400 and the reliability determination device 500 may be structured as a single unit. In this case, the annotation device 400 (the reliability determination device 500) performs both the process of acquiring an annotation result and metadata for the learning image and the process of calculating reliability information based on the metadata.

Further, the reliability determination device 500 and the learning device 600 may be structured as a single unit. In this case, the reliability determination device 500 (the learning device 600) performs both the process of generating data to be used for machine learning by calculating the reliability information and the process of performing machine learning based on the data.

Further, the learning device 600 and the inference device 700 may be structured as a single unit. In this case, the learning device 600 (the inference device 700) performs both the process of generating a trained model by performing machine learning and the inference process based on the trained model.

Further, the inference device 700 and the endoscope system 200 may be structured as a single unit. For example, the system control device 230, which is described later with reference to FIG. 3, of the endoscope system 200, includes the inference device 700. In this case, the endoscope system 200 performs both the control of each section of the endoscope system 200, including the control in capturing an inference target image, and the inference process using the trained model.

It is also acceptable to structure three or more devices of FIG. 1 as a single unit. For example, the annotation device 400, the reliability determination device 500, and the learning device 600 may be structured as a single unit. In this case, the process of generating data for learning including the annotation result and the reliability information and the learning process using the data are performed in a single device. Each device shown in FIG. 1 is not limited to those structured as a single unit, but may be implemented by distributed processes of a plurality of devices.

The system with regard to the present disclosure can be structured to enable the endoscope system, the server system, the user interface for the annotation operation, the user interface for the inference operation, and the like, to communicate with each other in a wired or wireless manner. The data accumulation function, the annotation function, the learning function, and the inference function may be implemented by any of these devices, or may be separately implemented by a plurality of devices. In the present disclosure, the single or multiple information processing devices included in these devices are referred to as processors. In addition, the devices that communicate with these devices implementing the characteristic functions and configurations of the present disclosure have functions and configurations that allow them to appropriately handle communication data. For example, the devices may be equipped with algorithms to handle communication data, or hardware for communication and information processing. Further, any one of the devices shown in FIG. 1 may be structured to operate a network of these devices so as to ensure the benefits and effects provided by the network.

As described above, FIG. 1 is an example of a system configuration, and the configuration of the system including the image processing system 100 can be modified in various ways.

2.2 image Processing System

Figure 2:
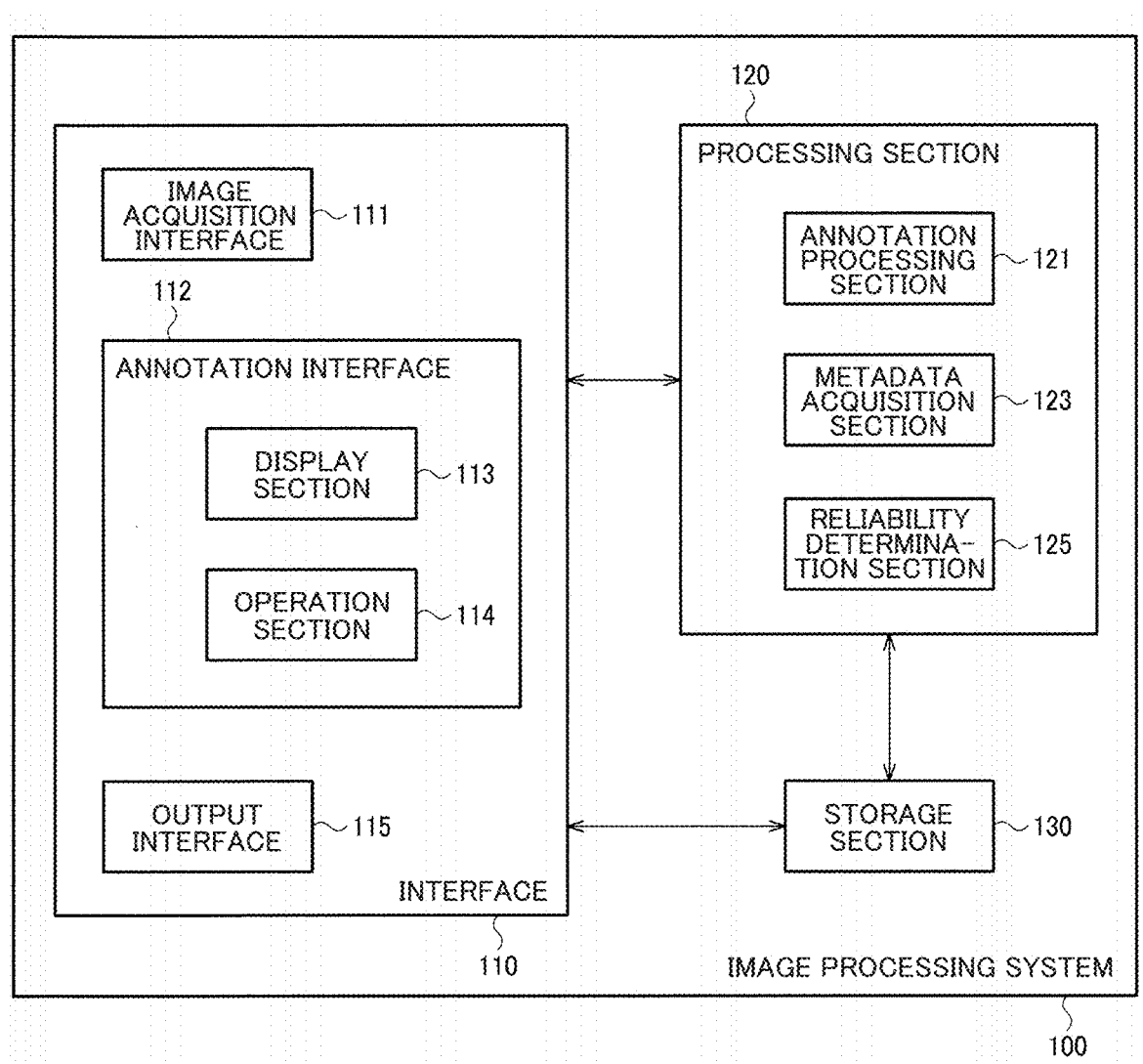
FIG. 2 is a configuration example of an image processing system.

FIG. 2 is a diagram showing a detailed configuration example of the image processing system 100. The image processing system 100 includes an interface 110, a processing section 120, and a storage section 130. The interface 110 includes an image acquisition interface 111, an annotation interface 112, and an output interface 115. The processing section 120 includes an annotation processing section 121, a metadata acquisition section 123, and a reliability determination section 125. However, the configuration of the image processing system 100 is not limited to the configuration illustrated in FIG. 2, and can be modified in various ways including omitting some of its components or adding other components.

The interface 110 performs data input and output. The image acquisition interface 111 is an interface for acquiring living body images captured by the image collection endoscope system 800 as learning images. The image acquisition interface 111 is implemented as a communication interface for receiving living body images, for example, from the image collection endoscope system 800 or the database server 300, via a network. The network herein may be a private network such as an intranet, or a public communication network such as the Internet. The network may be wired or wireless. The image acquisition interface 111 may acquire an image obtained by capturing inside a living body for each frame, nay acquire a plurality of images corresponding to multiple frames all at once.

The annotation interface 112 accepts annotations made by users. The annotation interface 112 includes, for example, a display section 113 that displays a learning image, which is the annotation target, and an operation section 114 that enables the user to perform input operations. The display section 113 is a display device, such as a liquid crystal display or an organic EL (Electro-Luminescence) display. The operation section 114 is a mouse or a keyboard. The display section 113 and the operation section 114 may be integrally structured in the form of a touch panel. The display images are specifically described later with reference to FIG. 6 and the like.

The output interface 115 is an interface for outputting processing results from the processing section 120. For example, the output interface 115 includes a first output interface that outputs an annotation result and metadata in association with a learning image, and a second output interface that outputs reliability information determined based on the metadata. The first output interface is included in, for example, the annotation device 400 of FIG. 1, and the second output interface is included in the reliability determination device 500. However, as described above, the image processing system 100 can be implemented using various configurations, and, for example, it may be embodied such that metadata is not output to the outside.

The processing section 120 performs each of the process of acquiring an annotation result and metadata and the process of determining reliability. The annotation processing section 121 performs display control of the display section 113 and a process of acquiring operation information from the operation section 114. Specifically, the annotation processing section 121 performs a process of generating a display image including display regions of the learning image and the annotation result, as well as a display control process, in order to allow the user to perform annotation. The annotation processing section 121 performs a process of acquiring an annotation result input by the user by operating the operation section 114 with respect to the display image.

The metadata acquisition section 123 acquires metadata for determining reliability of the annotation result. The metadata may be acquired by image processing as described later, may be acquired by counting an operation time using a timer or the like, or may be acquired based on a user's operation through the operation section 114. That is, the processing in the metadata acquisition section 123 includes various kinds of processing such as image processing, a process of acquiring information regarding time, and a process of acquiring operation information.

The reliability determination section 125 determines reliability information indicating the reliability of the annotation result based on the metadata. The reliability information is determined based on, for example, difficulty of annotation on the learning image and the capability of the user who performs the annotation. The processing is more specifically described later.

The storage section 130 serves as a work area for the processing section 120 and the like, and the function thereof can be realized by a semiconductor memory, a register, a magnetic storage device, or the like. The storage section 130 may store a learning image or images to be associated with an annotation result and reliability information among a large number of learning images stored in the database server 300. For a configuration in which the database server 300 is omitted, the storage section 130 may be provided as a storage device capable of accumulating a large number of learning images transmitted from the image collection endoscope system 800.

The processing section 120 is constituted of the following hardware. The hardware may include at least one of a circuit for processing digital signals and a circuit for processing analog signals. For example, the hardware may include one or a plurality of circuit devices or one or a plurality of circuit elements mounted on a circuit board. The one or a plurality of circuit devices is, for example, an integrated circuit (IC), FPGA (field-programmable gate array), or the like. The one or a plurality of circuit elements is, for example, a resistor or a capacitor.

The processing section 120 may be implemented by the following processor. The image processing system 100 includes a memory for storing information and a processor that operates based on the information stored in the memory. The memory herein may be the storage section 130 or a different memory. The information includes, for example, a program and various types of data. The processor includes hardware. The processor may be one of various processors including CPU (Central Processing Unit), a GPU (Graphics Processing Unit), a DSP (Digital Signal Processor), and the like. The memory may be a semiconductor memory such as an SRAM (Static Random Access Memory) or a DRAM (Dynamic Random Access Memory), or may be a register. The memory may also be a magnetic storage device such as an HDD (Hard Disk Device), or an optical storage device such as an optical disc device. For example, the memory stores therein a computer-readable commands, and the processes (functions) of the sections of the processing section 120 are implemented with the processor executing the commands. Specifically, the sections of the processing section 120 correspond to the annotation processing section 121, the metadata acquisition section 123, and the reliability determination section 125. These commands may be a command set included in a program, or may be commands to give instructions to the hardware circuit included in the processor. Furthermore, all or some of the sections of the processing section 120 may be implemented by cloud computing, and each process described below may be performed on the cloud computing.

The sections of the processing section 120 of the present embodiment may be implemented as modules of a program running on the processor. For example, the annotation processing section 121 is implemented as an image processing module for generating display images, a control module for controlling the display section 113, and an operation information acquisition module for acquiring operation information based on the operation section 114. The metadata acquisition section 123 is implemented as an image processing module, an information acquisition module for acquiring information regarding operation time and user operations, or the like. The reliability determination section 125 is implemented as a module for a process of determining reliability information.

The program that executes the processing performed by the sections of the processing section 120 of the present embodiment may be stored in an information storage device, which is, for example, a computer-readable medium. The information storage device can be implemented by, for example, an optical disc, a memory card, an HDD, a semiconductor memory, or the like. The semiconductor memory is, for example, a ROM. The processing section 120 performs various processes of the present embodiment based on a program stored in the information storage device. That is, the information storage device stores a program that causes a computer to function as each section of the processing section 120. The computer is a device including an input device, a processing section, a storage section, and an output section. Specifically, the program according to the present embodiment is a program that causes a computer to execute each of the steps described later with reference to FIG. 5, etc.

As described above, the image processing system 100 of the present embodiment includes the interface 110 to which an annotation result on a learning image captured inside a living body is input, and the processing section 120. The processing section 120 acquires metadata including difficulty information indicating difficulty in annotation on a learning image, and determines reliability information indicating reliability of an annotation result based on the metadata. The processing section 120 then outputs a dataset in which a learning image, an annotation result, and reliability information are associated with each other, as data used in generating a trained model used in inference based on deep learning on an inference target image captured inside a living body.

The image captured inside a living body includes various images such as an image of a lesion region, an image of a region of interest (ROI), an image of given cells, a medical image, and a pathological image. The region of interest of the present embodiment is a region with a relatively higher priority in observation for the user than other regions. In a case where the user is a physician who performs diagnosis or treatment, the region of interest corresponds to, for example, a region in which a lesion is captured. However, if the observation target required by the physician is bubbles or residues, the region of interest may be a region in which the bubble portion or the residue portion is captured. That is, although the target to which the user should pay attention varies depending on the purpose of observation, a region with a relatively higher priority of observation for the user than other regions for the observation at the time is regarded as the region of interest.

The annotation result is information given by annotations performed by the user. In a case where the trained model is a model for performing a classification process, the annotation result is label information indicating the classification result. The classification result may be, for example, a result obtained by classifying the target portion as lesional or normal, a result obtained by classifying the degree of malignancy of a polyp with predetermined scales, or a result obtained by performing other classifications. In a case where the trained model is a model for performing a detection process for detecting the position of the region of interest, the annotation result includes information that enables to specify the position of the region of interest. For example, the annotation result includes a detection frame and label information for specifying an object included in the detection frame.

The difficulty in the present embodiment indicates difficulty in performing annotation on a learning image. The difficulty information is information by which the difficulty can be specified. For example, the difficulty information is numerical data that increases as the difficulty in annotation increases and decreases as the difficulty in annotation decreases. However, the difficulty information is not limited to numerical data, and may be information specifying any one of predetermined scales such as low, medium, and high. The difficulty information may be the aforementioned numerical data or scales themselves, or other types of information that enables to specify the data or scales. For example, the difficulty information of the present embodiment may be information for specifying identifiability, image quality, shielded degree, operation time, and the like, which will be described later, or may be information calculated based on these parameters.

Also, the reliability in the present embodiment indicates a degree of certainty of the annotation result. The reliability information is information by which the reliability can be specified. The reliability information is, for example, numerical data that increases as the degree of certainty of the annotation result increases, and decreases as the degree of certainty of the annotation result decreases. The reliability information may also be information that specifies one of the predetermined scales.

The method of the present embodiment makes it possible to determine the reliability in consideration of the difficulty of annotation of the learning image itself. Therefore, even when the target is a living body image for which highly accurate expert data cannot be easily acquired, it is possible to associate an annotation result with appropriate reliability and construct a trained model with desirable inference accuracy.

This method of the present embodiment may also be applied to an image processing device including an interface to which an annotation result on a learning image captured inside a living body is input, and a processing section that acquires metadata including difficulty information indicating difficulty of performing annotation on the learning image and outputs the acquired metadata as information for determining reliability of the annotation result in association with the learning image. The learning image and the annotation result are used to generate a trained model that performs inference using deep learning on an inference target image captured inside a living body. The reliability is used as weight information of the objective function in deep learning.

The interface of the image processing device is specifically the annotation interface 112. The processing sections of the image processing device correspond specifically to the annotation processing section 121 and the metadata acquisition section 123. That is, the image processing device herein corresponds to the annotation device 400 shown in FIG. 1. In other words, the method of the present embodiment can be applied to the annotation device 400. By outputting the metadata together with the annotation result from the annotation device 400, it is possible to determine appropriate reliability information and construct a trained model with desirable inference accuracy using the reliability information.

Further, the method of the present embodiment can be applied to an interface. The interface herein refers to the interface 110 shown in FIG. 2 and the annotation interface 112 in a narrow sense. The interface includes an input section to which an annotation result on a learning image captured inside a living body is input. The input section is, for example, the operation section 114, but the specific embodiment thereof can be modified in various ways. The interface is connected to the processing section 120 and inputs, to the processing section 120, metadata including difficulty information indicating difficulty of performing annotation on a learning image. The processing section 120 determines reliability information indicating reliability of an annotation result based on the metadata. The processing section 120 also outputs a dataset in which a learning image, an annotation result, and reliability information are associated with each other, as data used in generating a trained model used in inference based on deep learning on an inference target image captured inside a living body.

The processing performed by the image processing system 100 of the present embodiment may be realized as an image processing method. The image processing method of the present embodiment acquires an annotation result on a learning image captured inside a living body, acquires metadata including difficulty information indicating difficulty of performing annotation on the learning image, determines reliability information indicating reliability of the annotation result based on the metadata, and outputs a dataset in which the learning image, the annotation result, and the reliability information are associated with each other, as data used in generating a trained model used in inference based on deep learning on an inference target image captured inside a living body.

2.3 Endoscope System

Figure 3:
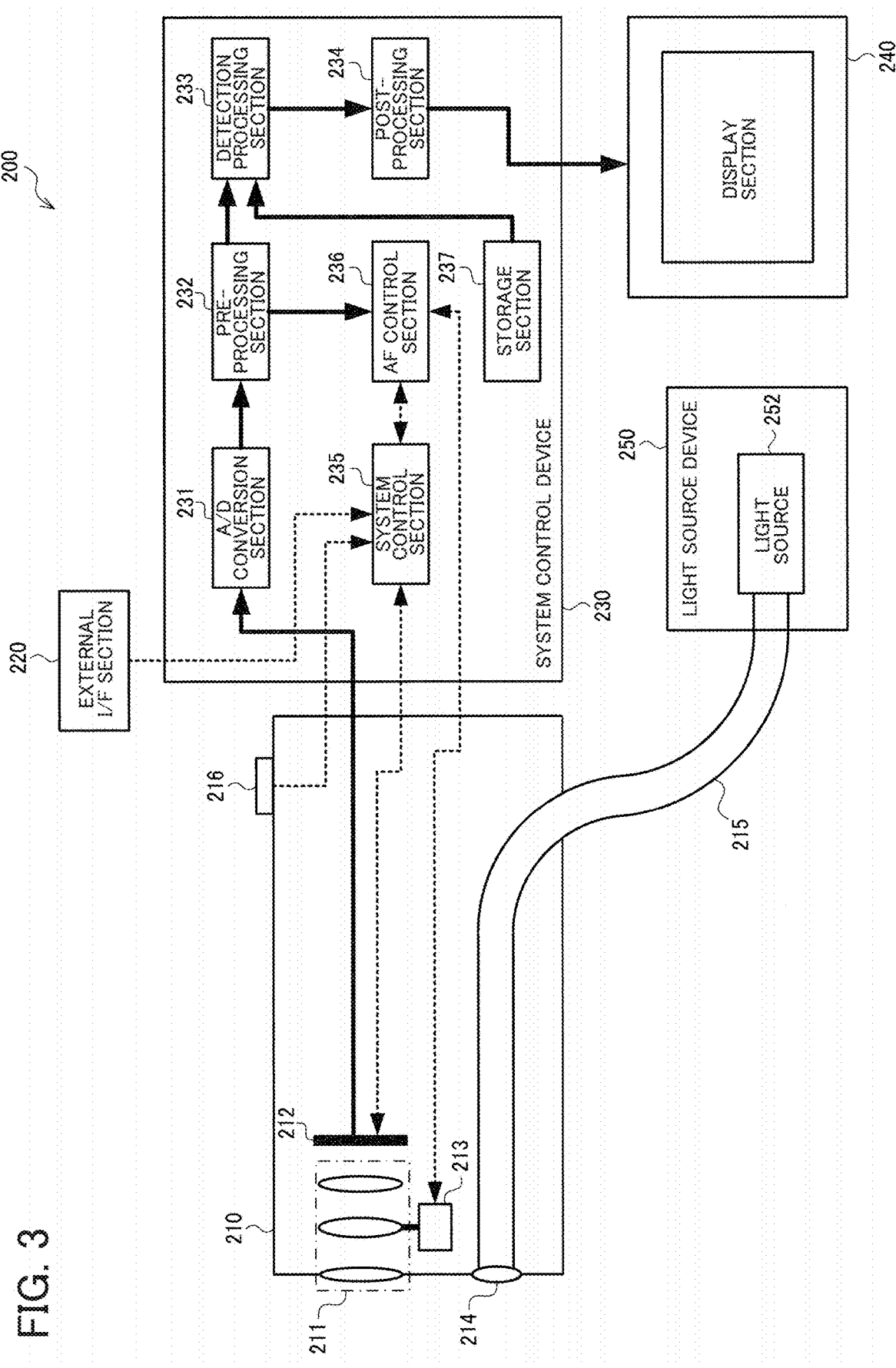
FIG. 3 is a configuration example of an endoscope system.

FIG. 3 is a configuration example of the endoscope system 200. The endoscope system 200 includes an insertion section 210, an external I/F section 220, a system control device 230, a display section 240, and a light source device 250.

The insertion section 210 is a portion with a top end to be inserted into a body. The insertion section 210 includes an objective optical system 211, the image sensor 212, an actuator 213, an illumination lens 214, a light guide 215, and an AF (Auto Focus) start/end button 216. The insertion section 210 may also be referred to as an endoscopic scope.

The light guide 215 guides illumination light emitted from a light source 252 to the top end of the insertion section 210. The illumination lens 214 emits, to the object, the illumination light guided by the light guide 215. The objective optical system 211 forms an image of light reflected from the object as an object image. The objective optical system 211 includes a focus lens and is capable of changing the position at which the object image is formed according to the position of the focus lens. The actuator 213 drives the focus lens based on an instruction from an AF control section 236. Note that AF is not essential, and the endoscope system 200 may have a configuration without the AF control section 236.

The image sensor 212 receives light from the object via the objective optical system 211. The image sensor 212 may be a monochrome sensor, or may be an element with a color filter. The color filter may be a Bayer filter, which is widely known, a complementary filter, or other filters. A complementary filter is a filter including filters of colors of cyan, magenta and yellow.

The AF start/end button 216 is an operation interface to enable the user to perform an AF start/end operation. The external I/F section 220 is an interface to enable the user to perform input to the endoscope system 200. The external I/F section 220 includes, for example, an AF control mode setting button, an AF region setting button, an image processing parameter adjustment button, and the like.

The system control device 230 performs image processing, control of the entire system, and the like. The system control device 230 includes an A/D conversion section 231, a pre-processing section 232, a detection processing section 233, a post-processing section 234, a system control section 235, an AF control section 236, and a storage section 237. In the following, an example in which processing on an inference target image is a process of detecting a region of interest is assumed, and the system control device 230 including the detection processing section 233 is described. The detection processing section 233 may be replaced with a configuration for performing other processes such as a classification process.

The A/D conversion section 231 converts analog signals sequentially output from the image sensor 212 into digital images, and sequentially outputs them to the pre-processing section 232. The pre-processing section 232 performs various types of correction processing on the living body images sequentially output from the A/D conversion section 231, and sequentially outputs the corrected images to the detection processing section 233 and the AF control section 236. The correction processing includes, for example, a white balance process, a noise reduction process, and the like.

The detection processing section 233 performs, for example, a process of transmitting the corrected image acquired from the pre-processing section 232 to the inference device 700 provided outside the endoscope system 200. The endoscope system 200 includes a communication section (not shown), and the detection processing section 233 performs communication control of the communication section. The communication section herein refers to a communication interface for transmitting living body images to the inference device 700 via a given network. Further, the detection processing section 233 performs a process of receiving detection results from the inference device 700 by performing communication control of the communication section.

It may also be structured such that the system control device 230 includes the inference device 700. In this case, the detection processing section 233 operates in accordance with the information of the trained model stored in the storage section 237 to thereby perform the inference process on the living body image, which is the inference target image. In a case where the trained model is a neural network, the detection processing section 233 performs a forward calculation on the inference target image as the input using a weight determined by the learning. Then, based on the output of the output layer, a detection result is output.

The post-processing section 234 performs post-processing based on the detection result in the detection processing section 233 and outputs the post-processed image to the display section 240. The post-processing herein may include various types of processing, such as emphasis of the detection target in the image, addition of information indicating the detection result, and the like. For example, the post-processing section 234 performs post-processing of generating a display image by superimposing a detection frame detected by the detection processing section 233 on the image output from the pre-processing section 232.

The system control section 235 is connected to the image sensor 212, the AF start end button 216, the external I/F section 220, and the AF control section 236, and controls each section. Specifically, the system control section 235 inputs and outputs various control signals. The AF control section 236 performs AF control using images sequentially output from the pre-processing section 232.

The display section 240 sequentially displays images output from the post-processing section 234. The display section 240 is, for example, a liquid-crystal display, an EL display, or the like. The light source device 250 includes the light source 252 that emits illumination light. The light source 252 may be a xenon light source, an LED, or a laser light source. The light source 252 may be a light source other than those, and the light emission method is also not limited.

The method of the present embodiment can be applied to the endoscope system 200 including an imaging section for capturing an inference target image, which is a living body image, and a processing section for performing an inference process on the inference target image based on a trained model trained through deep learning. The trained model has been trained based on a dataset in which the learning image captured inside a living body, the annotation result on the learning image, and the reliability information indicating the reliability of the annotation result determined based on the metadata given to the learning image are associated with each other. The metadata includes the difficulty information indicating the difficulty of performing annotation on the learning image. The learning image and the annotation result are the teacher data in deep learning, and the reliability information is the weight information of the objective function in deep learning.

The imaging section herein is, for example, the imaging device included in the insertion section 210 described above, more specifically the image sensor 212 that receives reflected light from the object via the objective optical system 211. The processing section herein corresponds, for example, to the system control device 230 shown in FIG. 3, and corresponds to the detection processing section 233 in a narrow sense. The trained model is stored, for example, in the storage section 237.

The method of the present embodiment makes it possible to perform the inference process on a living body image captured by the endoscope system 200 with desirable accuracy. For example, when a process of detection of a region of interest is performed, it is possible to suppress the possibility of overlooking regions of interest in the image and suppress the possibility of mistakenly detecting an irrelevant region as a region of interest. For example, when the inference target image is captured while simultaneously performing the inference process using the trained model, it is possible to properly support diagnosis and treatment by the physician by displaying the detected region of interest on the display section 240 of the endoscope system 200. However, the inference process using a trained model is not limited to a real-time process. For example, it is also possible to temporarily store image sequences captured by the endoscope system 200 in a database, and perform the inference process using a trained model on the image sequences after the diagnosis, etc. is completed.

3. Details of Processing

The following describes the flow of processing performed in a system including the image processing system 100 of the present embodiment. The entire process is described first, followed by each process in detail.

3.1 Entire Process

Figure 4:
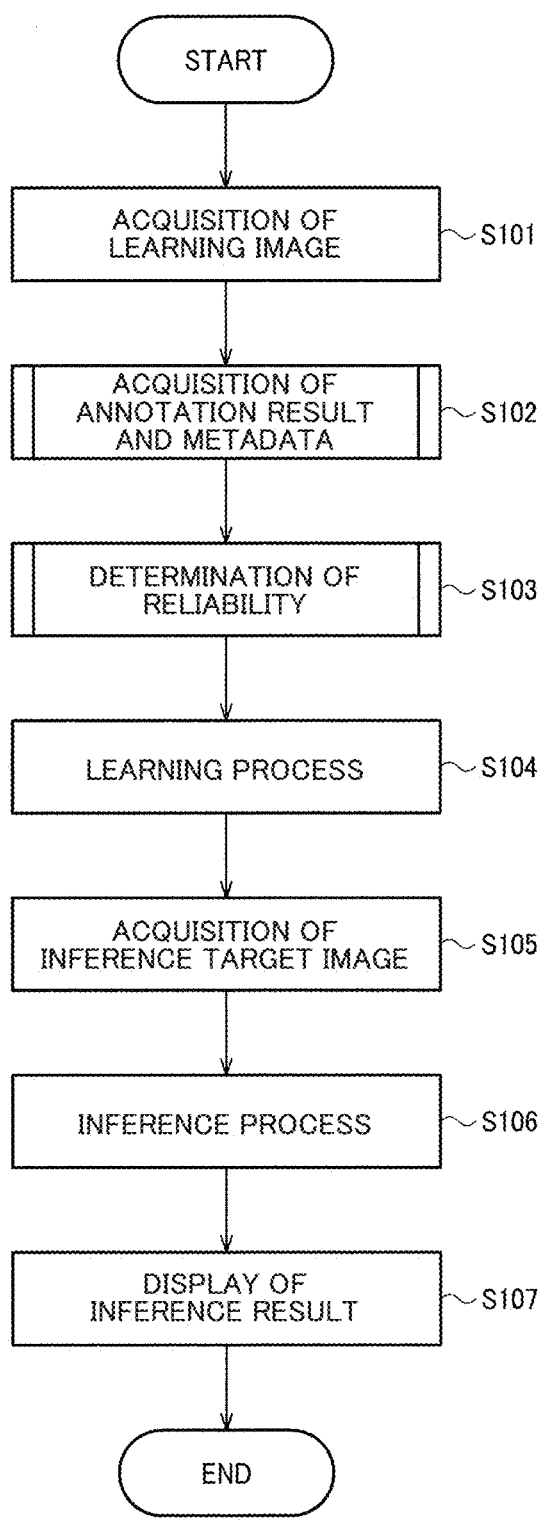
FIG. 4 is a flowchart describing processes in a system including an image processing system.

FIG. 4 is a flowchart describing processes performed in a system including the image processing system 100. First, in step S101, the image processing system 100 acquires a living body image as a learning image. The process in step S101 is, for example, a process of acquiring a living body image stored in the database server 300 by the image acquisition interface 111.

In step S102, the image processing system 100 acquires an annotation result with respect to the learning image given by the user and metadata for determining reliability of the annotation result. The details of the process in step S102 are described later with reference to FIGS. 5 to 8.

In step S103, the image processing system 100 determines reliability information based on the metadata. The details of the process in step S103 are described later with reference to FIGS. 9A to 10. The image processing system 100 outputs the learning image, the annotation result, and the reliability information in association with each other.

In step S104, the learning device 600 performs a learning process based on the learning image, the annotation result, and the reliability information output by the image processing system 100. The learning device 600 outputs a trained model, which is the result of learning.

In step S105, the inference device 700 acquires an inference target image. The process in step S105 may be a process of acquiring a living body image captured real-time by the endoscope system 200, or a process of reading out a living body image previously stored in the inference target database.

In step S106, the inference device 700 performs an inference process on the inference target image. Specifically, the process in step S106 is a process of calculating the result of classification of the inference target image, the result of detection of the region of interest, or the like, by inputting the inference target image to the trained model.

In step S107, the inference device 700 outputs the inference result. The process in step S107 may be a process of displaying an image indicating the inference result on the display section 240 of the endoscope system 200, or a process of storing the inference result in a database, or the like.

The annotation is assumed to be performed by a plurality of risers. In this case, the process in step S102 is executed for each user at an arbitrary timing. For example, when a certain number of learning images are accumulated in the database server 300, a request for execution of annotation is made for each user, and each user executes annotation at his/her convenience.

Further, the reliability information of the present embodiment can be determined based on the annotation result and the metadata of a single user without considering the relationship among multiple users. Therefore, the process in step S103 can be performed immediately after the process of step S102. However, as described later with reference to FIG. 10, the reliability information associated with the annotation result may be updated based on the reliability information of the annotation results given by multiple users. In this case, the process in step S103 may be performed on the condition that a predetermined number of the annotation results with the metadata have been accumulated.

The learning process in step S104 is executed when at least a predetermined number of datasets in which the learning image, the annotation result, and the reliability information are associated have been acquired. However, when the learning images are continuously acquired and annotated, the number of the datasets will increase over time. In this case, the learning process in step S104 may be repeated. For example, it is possible to perform the learning process with a newly-added dataset using a trained model already created as an initial value, thereby updating the trained model.

The processes in steps S105 to S107 are as described above, and the inference process using a trained model may be performed during or after the diagnosis using the endoscope system 200. In a case where the trained model is updated at all times, the inference device 700 may perform the inference process using the latest trained model, or may perform the inference process using a previous version of the trained model. In other words, the inference device 700 acquires the trained model generated by the learning device 600 at an arbitrary timing.

As described above, the flowchart shown in FIG. 4 is an example of processing in a system including the image processing system 100, and the actual flow of processing may be modified in various ways. Further, processes other than those shown in FIG. 4 may be added to the method of the present embodiment.

3.2 Annotation Result and Acquisition of Metadata

Figure 5:
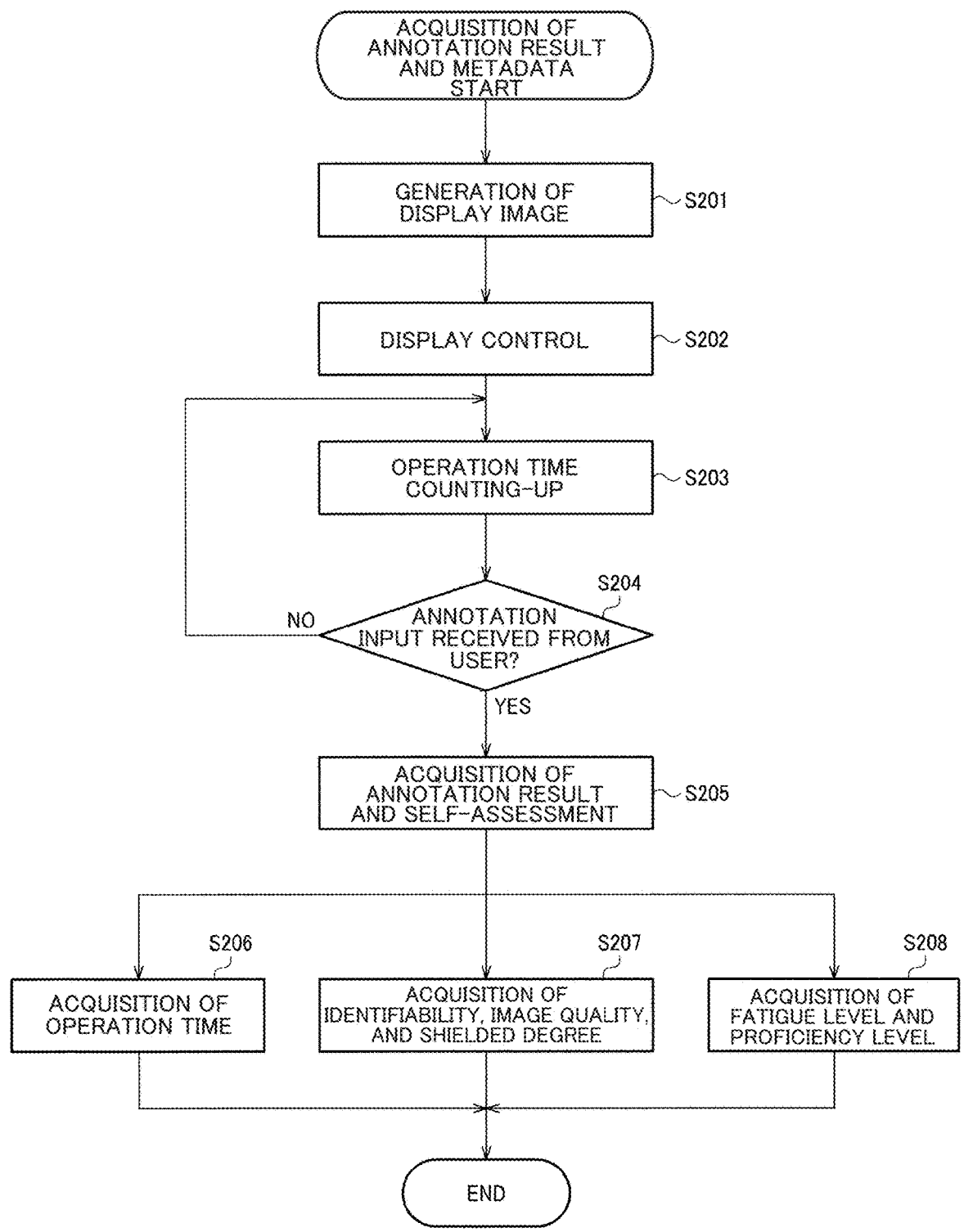
FIG. 5 is a flowchart describing an annotation result and a metadata acquisition process.

FIG. 5 is a flowchart describing an annotation result and a metadata acquisition process. As the process is started, the image processing system 100 generates a display image in step S201 and controls display of the display image in step S202. Specifically, the annotation processing section 121 generates a display image for annotation that includes a learning image acquired by the image acquisition interface 111, and performs control of display of the display image on the display section 113.

Figure 6:
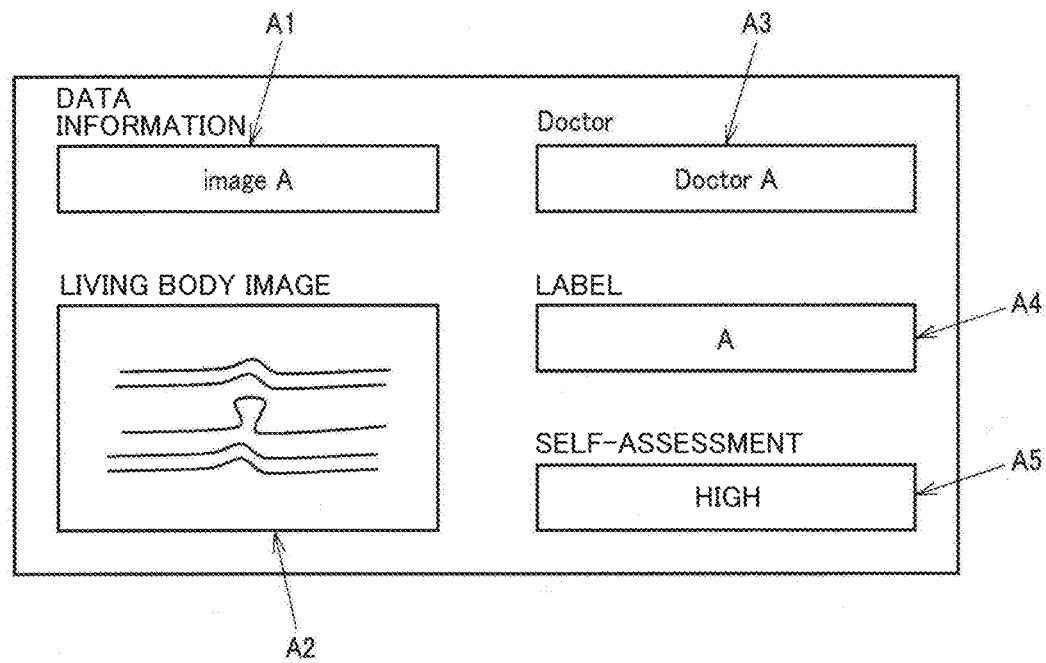
FIG. 6 is an example of a display image for annotation.

FIG. 6 is an example of a display image. As shown in FIG. 6, the display image includes display regions A1 to A5. A1 is a display region of information regarding a learning image, which is the target of annotation. A1 displays information specifying, for example, a learning image. A1 may also displays, for example, information of the patient from which the image is captured, information of the date and time of the imaging, information of the person who performed the imaging, and the like. The patient information includes, for example, age, sex, and the like of the patient.

A2 is a region in which a learning image to be annotated is displayed. A3 is a region in which information of a user who performs annotation is displayed. The user information may be input by the user himself/herself on the screen shown in FIG. 6, or may be acquired using information of login or the like into the annotation device 400.

A4 is a region in which the user inputs an annotation result. For example, A4 may be a text box or a similar input region. For example, the user performs an operation of selecting a display region A4 using a pointing device such as a mouse, and then inputs a character string indicating an annotation result using a keyboard or the like. FIG. 6 assumes annotation for generating a trained model to be used for an image classifying task, and the annotation result input to A4 is a result of image classification. The classification result is, for example, label information such as "normal" or "lesional". The classification result may also be label information regarding the type or degree of malignancy of a lesion. Further, the region A4 may be provided as an input form, such as a radio button or a select box.

A5 is a region for allowing input of self-assessment information indicating self-assessment of the user with respect to the annotation result. The self-assessment information is information indicating how much the user can assure the annotation result input to A4. The self-assessment information may be expressed in scales of low, medium, or high, or may be numerical data. As in A4, A5 may also be an input form of various forms such as a text box, a radio button, and a select box.

Figure 7:
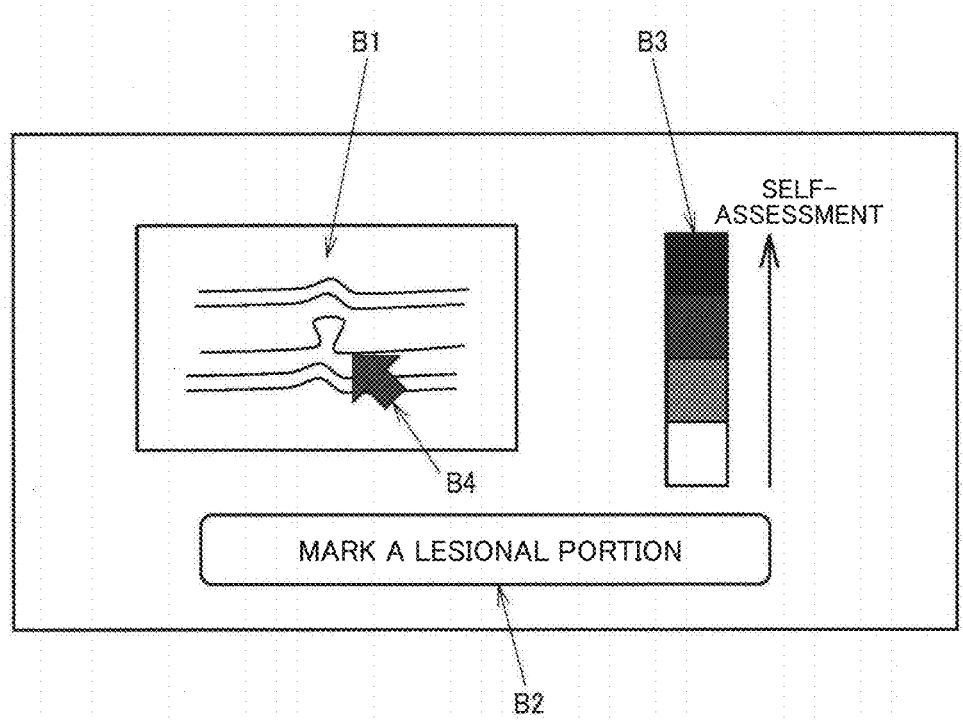
FIG. 7 is an example of a display image for annotation.

FIG. 7 is another example of a display image. As shown in FIG. 7, the display image includes display regions B1 to B3. As in A2 of FIG. 6, B1 is a region displaying a learning image. However, FIG. 7 assumes annotation for generating a trained model to be used for a detection task for detecting a region of interest. The annotation result includes information specifying the position of the region of interest in the image. Accordingly, B1 is a region to accept an operation for specifying the position of the region of interest from the user. For example, the user specifies an area surrounding the region of interest by operating the pointer shown in B4 using a pointing device. The user input can be performed by, for example, an operation of clicking an end point of a frame region of a rectangular and then dragging it to a diagonal end point, but may also be performed by another operation. For example, instead of specifying the region of interest in a rectangle shape, the region of interest may be surrounded by an irregular boundary line, or may be painted out.

B2 is a region in which text encouraging the user to perform annotation is displayed. As in A5 of FIG. 6, B3 is a region for allowing input of self-assessment of the user with respect to the annotation result. As shown in B3 of FIG. 7, the self-assessment may be input using a heat map in which the level of self-assessment is expressed by shading. In the example of FIG. 7, the user can input self-assessment by selecting one of the four rectangular regions using a pointing device, or the like. As in B3, it may be arranged such that the self-assessment is not shown to the user but may instead be set automatically based on the operation time.

Although not shown in FIG. 7, display regions corresponding to A1 and A3 in FIG. 6 may be provided. In FIGS. 6 and 7, the display images can be modified in various ways such as omitting some display regions or adding display regions not shown. For example, as described later, annotation for generating a trained model for a region segmentation task for classifying the object on a pixel-by-pixel basis may be performed. In this case, the operation section 114 accepts a user's operation of painting out the region where the region of interest is captured. The annotation processing section 121 acquires an annotation result based on the user's operation. The annotation result is, for example, mask data in which the pixel value of the region of interest specified by the user is the first value and the pixel values of other regions are the second values.

The explanation continues below with reference to FIG. 5 again. Once the display image is shown, in step S203, the metadata acquisition section 123 of the image processing system 100 starts counting the operation time. The operation time herein means a type of metadata and represents the time consumed by the user to perform annotation on the target learning image.

In step S204, the image processing system 100 determines whether annotation input by the user has been accepted. For example, determination is performed as to whether the label information, which is the classification result, is input in A4 in FIG. 6 and whether the self-assessment information is input in A5. It may also be arranged such that the display image has a "Done" button (not shown). In this case, the image processing system 100 may determine that annotation input has been accepted when the label information and the self-assessment information have been input and the "Done" button is pressed. When it is determined as No in step S204, the image processing system 100 waits for annotation input by the user while counting the operation time.

When it is determined as Yes in step S204, in step S205, the annotation processing section 121 acquires an annotation result input through the display image. Further, in step S205, the metadata acquisition section 123 acquires, as metadata, the self-assessment information indicating self-assessment input through the display image. That is, a part of metadata may be input using an interface for inputting annotation.

In step S206, the metadata acquisition section 123 acquires, as metadata indicating difficulty, operation time information indicating the operation time. For example, the metadata acquisition section 123 stops counting the operation time at the timing when it is determined as Yes in step S204, and acquires the count result at that timing as operation time information. Alternatively, the metadata acquisition section 123 may acquire, as the operation time information, information specifying a time period from a start point, which is the start timing of display control in step S202, to an end point, which is the timing when it is determined as Yes in step S204.

In step S207, the metadata acquisition section 123 acquires, as metadata indicating difficulty, identifiability information indicating identifiability of the region of interest in the learning image, image quality information indicating image quality of the learning image, and shielded degree information indicating the imaging state of obstruction in the learning image.

The identifiability of a region of interest is information indicating easiness in distinguishing the region of interest from other regions. It is determined that, the lower the identifiability, the higher the difficulty. For example, in an example where a detection frame indicating the location of the region of interest is input as the annotation result, the metadata acquisition section 123 acquires identifiability of the detection frame. The identifiability information is, for example, information indicating a difference between the pixel value inside the detection frame and the pixel value outside the detection frame. The pixel value herein means, for example, a histogram of pixel values in multiple pixels. Alternatively, the identifiability information may be information indicating a difference in brightness or hue between the inside and outside of the detection frame, or information indicating whether or not the edges indicating the boundary between the inside and outside are clear.

The image quality of the learning image is an image state expressed by brightness, contrast, sharpness, noise, and the like of the image. For brightness, contrast, and sharpness, the higher the value, the higher the image quality for noise, the lower the noise level, the higher the image quality. It is determined that the lower the image quality, the higher the difficulty. The image quality information may be information specifying any one of the brightness, contrast, sharpness, and noise, or information corresponding to a combination of two or more of these. The image quality information may be calculated from the entire learning image or a part of the learning image. A part of the learning image herein means a region where the region of interest is likely to be captured, which is, for example, the central region of the learning image.

An obstruction in the learning image is an object that exists between the region of interest and the imaging section of the endoscope system 200 and may obstruct observation of the region of interest. The shielded degree is the degree of hiding the region of interest due to the presence of the obstruction. It is determined that the higher the shielded degree, the higher the difficulty. The obstruction may be, for example, foam, inflammation, residue, a treatment tool, or the like. Since the colors of bubbles, residues, and treatment tools are different from living organisms, they can be detected by image processing. Inflammation can also be detected by image processing because of its characteristic redness or the like. The metadata acquisition section 123 performs a process of detecting obstruction in the learning image and calculates shielded degree information as the metadata based on the detection results. The shielded degree information may be determined, for example, depending on the presence/absence of obstruction, or based on the ratio of the area of obstruction to the area of the learning image. When the location of the region of interest is input as the annotation result, the shielded degree information may be determined according to the distance or overlapping degree between the obstruction and the region of interest. As the probability of shielding the region of interest by the obstruction increases, the shielded degree represented by the shielded degree information is set higher.

In step S208, the metadata acquisition section 123 acquires fatigue level information indicating the fatigue level of the user and the proficiency level information indicating the proficiency level, as the metadata indicating the capability of the user who performed the annotation.

The fatigue level information is information indicating the fatigue level of the user at the time of execution of annotation. The metadata acquisition section 123 calculates the fatigue level information based on the cumulative operation time, for example, when the user consecutively performed annotation on a plurality of learning images. The cumulative operation time is the sum of the operation time spent for the annotation of the learning images. For example, the metadata acquisition section 123 determines that annotations are consecutively performed when the interval between the completion of annotation on a given learning image and the display of the next learning image is less than a predetermined time. Alternatively, the metadata acquisition section 123 may regard annotations performed during a period from a user's login into the annotation device 400 to the log-out as consecutively performed annotations.

The fatigue level information may also be determined from other types of information. For example, the metadata acquisition section 123 may acquire living body information indicating a user's biological activity from the image capturing device or various sensors attached to the user, and determine the fatigue level information based on the living body information. The living body information is, for example, degree of eyelid opening, perspiration, heart rate, electroencephalogram, and the like of the user. Alternatively, the metadata acquisition section 123 may calculate the fatigue level information based on information regarding sleeping hours of the user. The sleeping hours may be input by the user or automatically calculated based on heart rate or electroencephalogram measured while sleeping.

The proficiency level information indicates the proficiency level of the user in performing annotation. The metadata acquisition section 123 may determine the proficiency level information based on either or both of the number of times of endoscope usage, which is the number of times the user has performed diagnosis, observation, and the like using an endoscope system and the number of times the user has performed annotation. The number of times the user has performed annotation may be the number of the learning images that have been annotated, or a result obtained by counting the entire series of annotation described above as one performance of annotation. The number of times of endoscope usage and the number of times the user has performed annotation may be input by the user. The user input is provided, for example, using the display region A3 in FIG. 6. It is also possible to prepare a database in which the user, the number of times of endoscope usage of the user, and the number of times the user has performed annotation are associated with each other, and the metadata acquisition section 123 may acquire information for determining the proficiency level information by referring to the database.

The number of times of endoscope usage is preferably the number of diagnoses or the like performed on similar objects as the learning image to be annotated. For example, in the case of performing annotation to identify polyps in a large-intestine image captured using a lower endoscope, the proficiency level information is calculated based on the number of times of performing diagnosis, and the like using a lower endoscope. Similarly, the proficiency level information in the case of annotating a large-intestine image is preferably calculated based on the number of times of annotation performed on large-intestine images.

As shown in FIG. 5, for example, processes in steps S206 to S208 are performed in parallel. The processes through steps S206 to S208 are not limited to those performing all of them. Some of these processes may be omitted.

As described above, the processing section 120 of the present embodiment acquires the difficulty information by performing image processing on the learning image. The easiness of annotation is different even among experts depending on the type of image. However, this point is not taken into consideration in the previously-known methods such as the method of Japanese Unexamined Patent Application Publication No. 2009-282686. The method of the present embodiment makes it possible to acquire metadata for determining the reliability of the annotation result based on the characteristics of the learning image. This makes it possible to determine the reliability of the annotation result for each image.

The difficulty information acquired based on image processing contains at least one of information indicating identifiability of the annotation target in the learning image, information indicating the image quality of the learning image, and information indicating the shielded degree of the annotation target in the learning image.

The identifiability, image quality, and shielded degree are as described above, and each information can be determined based on various types of image processing. In this way, it is possible to determine the difficulty in terms of whether the annotation target is easily distinguished from other objects, whether the object is highly visible in the image, and whether the annotation target is shielded by an obstruction. The region of interest is a region where the annotation target is captured, and, as mentioned above, the specific annotation target can be modified in various ways. For example, although it has been described that bubbles and residues are regarded as obstructions in the above case of performing annotation on a lesion, bubbles and residues may also be regarded as annotation targets.

The difficulty information may also include operation time information indicating the time required to give an annotation result of a learning image. The operation time information may be the operation time itself or other information that can specify the operation time. For example, the operation time information may be a combination of information of a time point specifying the start of operation and information of a time point specifying the completion of annotation.

This enables to determine the difficulty of performing annotation based on the time required for the annotation by the user. If the operation time is short, the difficulty is determined to be if the operation time is long, the difficulty is determined to be high.

As described above, the difficulty information may include various types of information such as identifiability, image quality, shielded degree, operation time, and the like. The difficulty information may be any one or a combination of two or more of these types of information.

Among various types of difficulty information, the operation time information needs to be determined in consideration of the performance state of the annotation by the user. Specifically, the metadata acquisition section 123 acquires the operation time information by specifying the start timing and end timing of annotation.

The difficulty information obtained by image processing can be calculated at various timings and is not limited to step S207 in FIG. 5. The image quality information can be calculated at any timing after the learning image is acquired. For example, after the learning image is acquired, the image quality information may be calculated before the annotation is performed. If the shielded degree information is information not taken into consideration the location of the region of interest, such as presence or absence or the size of obstruction, the shielded degree information may also be calculated at any timing after the learning image is acquired.

On the other hand, for the identifiability information, it is necessary to distinguish the region of interest from other regions; therefore, the identifiability information is preferably calculated after the acquisition of the annotation result by the user, for example, after it is determined as Yes in step S204 of FIG. 5. In the calculation of the shielded degree information based on the positional relationship between the obstruction and the region of interest, the shielded degree information is also preferably calculated after the acquisition of the annotation result by the user. However, it is also possible to perform the process assuming the location of the region of interest to be, for example, the center of the image. In this case, the metadata acquisition section 123 may calculate the identifiability information and the shielded degree information before the annotation is performed.

The metadata of the present embodiment may also include capability information indicating the capability of the user who inputs an annotation result using the interface 110. As described below, the processing section 120 determines the reliability information based on the difficulty information and the capability information.

In this way, it is possible to calculate the reliability in consideration of both the difficulty information, which is an index attributable to the learning image, and the capability information, which is an index attributable to the user. Thus, even for learning images having the same difficulty, it is possible to determine appropriate reliability according to the user's capability.

The capability information of the present embodiment may include fatigue level information indicating the fatigue level of the user. As described above, the fatigue level information may be determined based on various types of information.

As described above, it is assumed that the user performs annotation on a certain number of learning images. Therefore, the user's fatigue is accumulated as the annotation continues, and the accuracy of annotation presumably decreases. The method of the present embodiment makes it possible to vary the reliability of the annotation result even for the same user according to the fatigue level of the user. Further, the fatigue level indicated by the fatigue level information of the present embodiment is not limited to the fatigue level as a result of continuation of a series of annotations. For example, by calculating the fatigue level information using living body information, it is possible to calculate the fatigue level in consideration of the actual state of the biological activity of the user. For example, when the user is sleep-deprived or in poor health, or when the user performs annotation as the final task of the day, it is possible that the user already has cumulative fatigue even in the beginning of the series of annotations. By using living body information, it is possible to consider a fatigue level not attributable to the annotation.

In addition, the capability information may include proficiency level information indicating the proficiency level of the user. In this way, it is possible to calculate the capability information in consideration of both the original proficiency level of the user and a decrease in the capability due to fatigue. That is, it is possible to accurately evaluate the annotation capability of the user, compared to the previously-known methods which consider only the expertise of the user.

The interface 110 of the image processing system 100 may accept, as metadata, self-assessment information indicating self-assessment of the user who has input the annotation result. The processing section 120 determines the reliability information based on the metadata including the self-assessment information.

The interface 110 herein is, for example, the annotation interface 112. That is, the acceptance of the annotation result and the acceptance of the self-assessment information, which is metadata, may be performed by the same interface. However, another interface for accepting the self-assessment information may be provided separately from the annotation interface 112.

As described above, there is an advantage that the difficulty information and the capability information can be calculated and acquired in the image processing system 100, and that it is not necessary for the user to directly input the metadata. On the other hand, the self-assessment information directly reflects the user's own opinion. Therefore, by using the self-assessment information, it is possible to calculate the reliability using information with a viewpoint different from those of the difficulty information and the capability information.

The interface 110 includes the display section 113 that displays display images including learning images. The processing section 120 may perform a process of displaying metadata in a display image. Examples of the metadata to be displayed here include self-assessment information shown in A5 in FIGS. 6 and B3 in FIG. 7. The self-assessment information needs to be input by the user. By thus allowing the user to input also the self-assessment information in the display image in which the learning image is displayed, it is possible to improve the convenience of the user. However, the metadata displayed in the display image for annotation is not limited to the self-assessment information.

Figure 8:
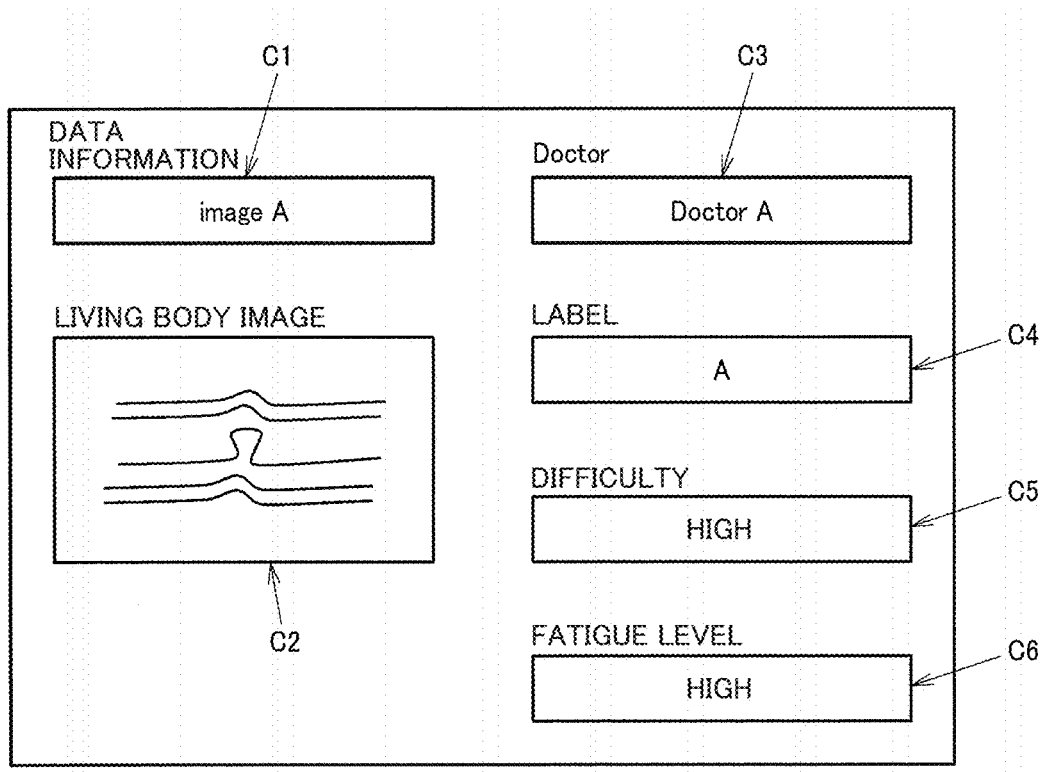
FIG. 8 is an example of a display image for annotation.

FIG. 8 is another example of display image for annotation. As shown in FIG. 8, the display image includes display regions C1 to C6. As in A1 to A4 in FIG. 6, the display regions C1 to C4 are used to input information regarding a learning image, a learning image, user information, and an annotation result, respectively.

C5 is a display image showing the difficulty information acquired by the metadata acquisition section 123. Since the operation time information is unknown until the annotation is completed, the difficulty information here is information acquired based on, for example, the image quality. However, the display image may include a region showing the operation time information being currently counted.

C6 is a display image showing fatigue level information acquired by the metadata acquisition section 123. The fatigue level information herein may be, for example, information acquired based on the living body information, or information acquired based on cumulative operation time. The cumulative operation time may be the total operation time until the annotation for an immediately preceding learning image is completed, or may be a value obtained by adding the operation time currently counted to the total time. Although this case uses fatigue level information as an example of the capability information, the display image may include, as the display target, the proficiency level information or both the proficiency level information and the fatigue level information.

In this way, it is possible to present to the user the difficulty information and the capability information that can be acquired in the background. Further, by displaying such metadata, it is also possible to notify the user of a situation in which annotation is likely to be erroneous due to at least one of the difficulty of the learning image and the capability of the user. Accordingly, it is possible to prevent the user from giving an inappropriate annotation result.

3.3 Calculation of Reliability

Next, a process of determining reliability by the reliability determination section 125 is described below. The reliability determination section 125 acquires reliability information indicating the reliability of the annotation result based on the metadata described above.

The metadata includes, for example, the difficulty information and the capability information. For ease of explanation, the following first describes an example in which the difficulty information is the operation time information, and the capability information is the proficiency level information, which is acquired based on the number of annotations.

Figure 9A:
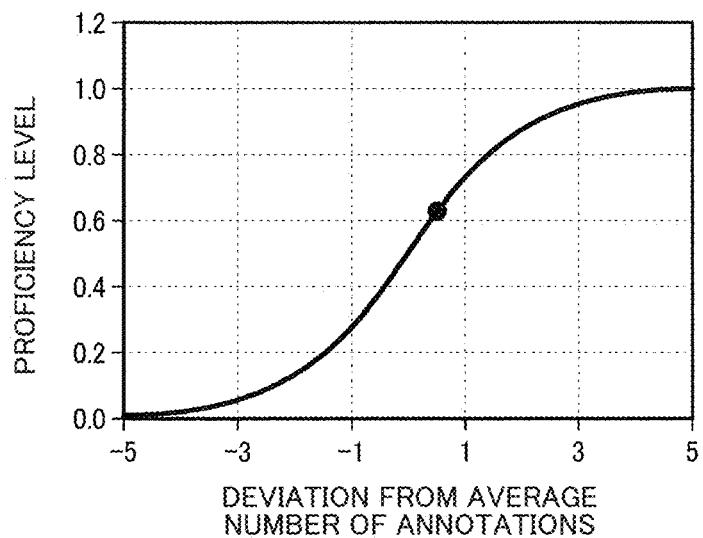
FIGS. 9A and 9B are examples of functions for determining a proficiency level.
Figure 9B:
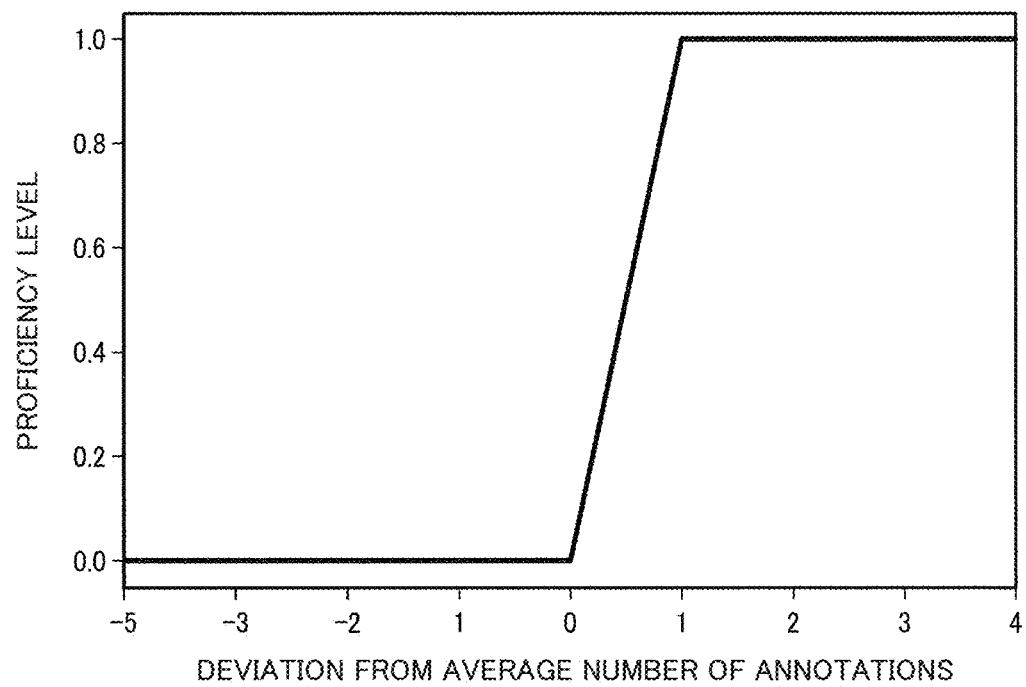

FIGS. 9A and 9B are diagrams describing the function for calculating a proficiency level based on the number of annotations. In the present embodiment, the average, variance, standard deviation, and the like of the number of annotations performed by a plurality of users are calculated in advance. The reliability determination section 125 calculates the deviation from the average number of annotations based on the number of annotations acquired as metadata. In FIGS. 9A and 9B, the horizontal axis represents the deviation from the average number of annotations, and the vertical axis represents the proficiency level. As shown in FIG. 9A, the reliability determination section 125 may calculate the proficiency level using a Sigmoid function. More specifically, the larger the number of annotations compared with the average number of annotations, the greater the proficiency level, and the smaller the number of annotations compared with the average number of annotations, the lesser the proficiency level. Further, the reliability determination section 125 may calculate the proficiency level using a Step function as shown in FIG. 9B. In this case, when the number of annotations is equal to or less than a predetermined number, the proficiency level can be set low.

Similarly, also with regard to the difficulty information, the average, variance, standard deviation, and the like of the operation times of annotations performed by a plurality of users are calculated in advance. The reliability determination section 125 calculates the deviation from the average operation time based on the operation time information acquired as metadata. For example, a Sigmoid function may be used also as a function for determining the difficulty from the deviation from the average operation time. That is, the longer the operation time compared with the average operation time, the higher the difficulty, and the shorter the operation time compared with the average operation time, the lower the difficulty. A different function, such as a Step function, may be used as the function for determining the difficulty from the operation time.

The reliability determination section 125 calculates the reliability based on, for example, the following equation (1) wherein f1 is a function having a capability as a variable, and is a monotonically-increasing function not less than 0 and not more than 1, The monotonic increase herein means a monotonic increase of a broad sense, and $f1'(x)=0$ with a given value x is allowed. $f1'$ represents the differential of $f1$. $f2$ is a function having difficulty as a variable, and is a monotonically-decreasing function not less than 0 and not more than 1. a and b are positive numbers that satisfy, for example, $a+b=1$.

$$\text{Reliability} = a \times f1(\text{capability}) + b \times f2(\text{difficulty}) \quad (1)$$

As described above with reference to FIGS. 9A and 9B, when the capability and the difficulty are values normalized from 0 to 1, for example, $f1(x)=x^3$ and $f2(x)=1-x^3$. Further, when the difficulty is normalized from 0 to 1, and when the higher the difficulty, the smaller the value, $f2(x)=x^3$ may also be satisfied. In this case, the reliability is a value not less than 0 and not more than 1, and the value of the reliability increases as the capability increases and as the difficulty decreases. For example, although $a=b=\frac{1}{2}$ is satisfied, the values of the coefficients a and b can be changed in various ways.

The reliability determination section 125 may calculate the reliability based on the following equation (2). In equation (2), f3 is a function having a capability as a variable, and is, for example, a monotonically-increasing function having a value not less than 0 and not more than 1, f4 is a function having difficulty as a variable, and is, for example, a monotonically-increasing function having a value of 1 or more. Also in this case, the reliability has a value not less than 0 and not more than 1, and the value of the reliability increases as the capability increases and as the difficulty decreases.

$$\text{Reliability} = f3(\text{capability})/f4(\text{difficulty}) \quad (2)$$

However, the equation for determining the reliability and the range of the value of the reliability are not limited to the above expressions (1) and (2), and can be modified in various ways. In a broad sense, the reliability determination section 125 may calculate the reliability based on the following (3). In the expression (3), f0 is a multivariable function having a capability and difficulty as variables. For example, f0 is an arbitrary function having a partial differential of not less than 0 with respect to the capability and a partial differential of not more than 0 with respect to the difficulty.

$$\text{Reliability} = f0(\text{capability, difficulty}) \quad (3)$$

The metadata may also include self-assessment information. In this case, the reliability determination section 125 max calculate the reliability according to, for example, the expression (4) below, or may calculate the reliability according to the expression (5) below. For example, f5 (self-assessment) in the expression (4) is a monotonically-increasing function not less than 0 and not more than 1. When the self-assessment is normalized from 0 to 1, for example, $f5=x^3$. c is a positive number that satisfies, for example, $a+b+c=1$. f6 (self-assessment) in the expression (5) is a monotonically-increasing function not less than 0 and not more than 1. In other words, the above expression (3) can be extended as in the expression (6) below.

$$\text{Reliability} = a \times f1(\text{capability}) + b \times f2(\text{difficulty}) + c \times f5(\text{self-assessment}) \quad (4)$$

$$\text{Reliability} = \{f3(\text{capability}) \times f6(\text{self-assessment})\}/f4(\text{difficulty}) \quad (5)$$

$$\text{Reliability} = f0(\text{capability, difficulty, self-assessment}) \quad (6)$$

Further, as described above, the difficulty information may include various types of information such as identifiability, image quality, shielded degree, operation time, and the like. The reliability determination section 125 may specify a standard operation time based on the identifiability, the image quality, and the shielded degree, and calculate the difficulty based on a process of comparison between the standard operation time and the operation time. The reliability determination section 125 sets the difficulty to a higher value as the operation time becomes longer than the standard operation time, and set the difficulty to a lower value as the operation time becomes shorter than the standard operation time. Further, the difficulty may be determined by a function f7 having the identifiability, the image quality, the shielded degree, and the operation time as variables according to the following expression (7). f7 is a function having a value that becomes greater as the identifiability becomes lower, as the image quality becomes lower, as the shielded degree becomes higher, and as the operation time becomes longer. In other words, the above expression (6) can be extended as in the expression (8) below. Further, the image quality may be considered as information determined by a function having the brightness, contrast, sharpness, and noise of the image as variables.

Difficulty=f7(identifiability, image quality, shielded degree, operation time) (7)

Reliability=f0(capability, identifiability, image quality, shielded degree, operation time, self-assessment) (8)

Similarly, the capability information may include the proficiency level information and the fatigue level information. The capability information may be determined by, for example, a function f8 having the proficiency level information and the fatigue level information as variables according to the following expression (9). f8 is a function having a larger value as the proficiency level becomes higher and as the fatigue level becomes lower. In other words, the above expression (6) can be extended as in the expression (10) below. Further, the above expression (8) and the expression (10) below may be combined. In this case, the reliability serves as a function of the proficiency level, the fatigue level, the identifiability, the image quality, the shielded degree, the operation time, and the self-assessment.

Capability=f8(proficiency level, fatigue level) (9)

Reliability=f0(proficiency level, fatigue level, difficulty, self-assessment) (10)

Figure 10:
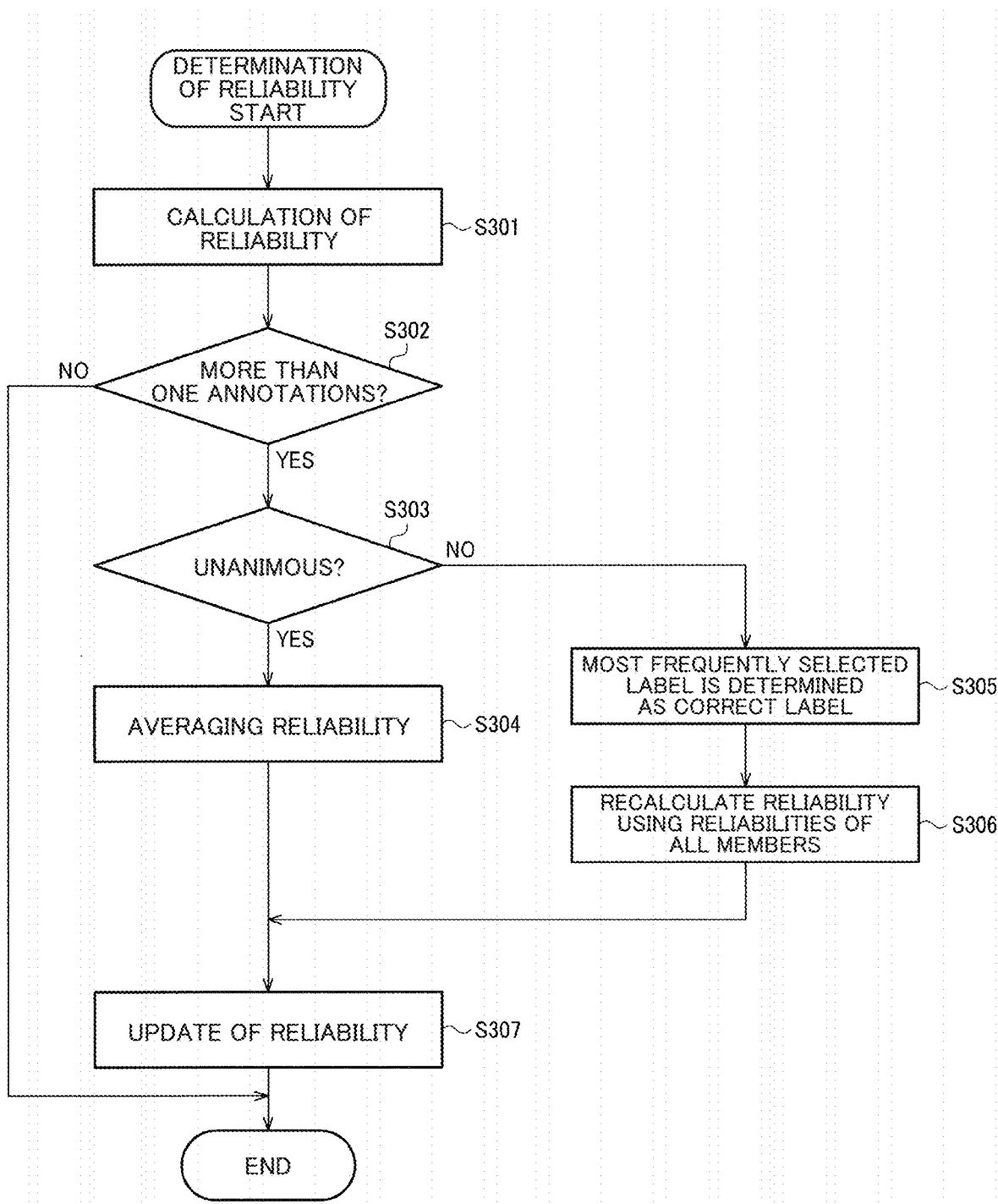
FIG. 10 is a flowchart describing a process of determining reliability.

FIG. 10 is a flowchart describing a process of determining reliability. When the process is started, in step S301, as described above, the reliability determination section 125 calculates the reliability of an annotation result added to each learning image based on the metadata associated with the learning image. The method according to the present embodiment enables calculation of reliability based on metadata, and does not necessarily require comparison between a plurality of users.

As described above, annotation results for living body images, which are used as the learning images in the present embodiment, vary even between experts. Therefore, when there are annotation results of a plurality of users for a single learning image, it is possible that annotation results that contribute to improvement of the learning accuracy and annotation results that rather decrease the learning accuracy are mixed. According to the method of the present embodiment, the calculation in step S301 is performed such that the reliability of the former is high and the reliability of the latter is low. Therefore, all learning images and the annotation results may be used in the learning process. However, in a case where there are annotation results of a plurality of users for a single learning image, it is possible to integrate the annotation results given to the learning image and update the reliability, thereby determining the reliability of the integrated annotation result. In this manner, it is possible to assign more appropriate annotation result and reliability to a single learning image, thereby constructing a trained model with higher inference accuracy compared with a case where each annotation result is directly used for the learning.

Step S302 and subsequent steps correspond to integration of annotation results and a process of updating the reliability. First, in step S302, the reliability determination section 125 determines whether or not there are annotation results by a plurality of users for a single learning image.

When there are annotation results by a plurality of users (Yes in step S302), in step S303, the reliability determination section 125 determines whether or not the plurality of annotation results is consistent. In the case where the annotation results represent the classification results of the learning image, the process of step S303 is a determination as to whether or not all of the classification results are consistent.

When the plurality of annotation results is consistent (Yes in step S303), in step S304, the reliability determination section 125 uses, as the reliability, the mean value of the reliabilities of the annotation results given by the plurality of users. In step S304, the reliability determination section 125 may use, as the reliability, the maximum value of the reliabilities of the annotation results given by the plurality of users. In any case, it is possible to specify a single annotation result and a single reliability for a single learning image.

When the plurality of annotation results is inconsistent (No in step S303), in step S305, the reliability determination section 125 determines a new annotation result according to the majority rule. Specifically, the reliability determination section 125 performs a process of counting the number of each classification result among the plurality of annotation results assigned to the target learning image. For example, when there are label A and label B representing classification results, the reliability determination section 125 counts the number of labels A and the number of labels B. Then, the reliability determination section 125 uses a label specifying a classification result having the maximum number of counts as the annotation result.

In step S306, the reliability determination section 125 performs a process of updating the reliability. For example, when label A is selected in step S305, the reliability determination section 125 averages the reliabilities of the users who predicted label A and subtracts the values based on the reliabilities of the users who predicted other labels from the average result, thereby determining updated reliability. Specifically, the reliability determination section 125 updates the reliability according to the following expression (11). In the following expression (11), "Conf_new" represents the updated reliability. "Conf_truth" represents the average value of reliabilities of the users who predicted label A. "ΣConf_other" represents the total value of the reliabilities of the users who predicted labels other than label A, and n represents the number of all users who performed annotation of the target learning image. As shown above, a process of decreasing the reliability is performed when the annotation results vary.

[Math. 1]

$$\text{Conf\_new} = \text{Conf\_truth} - \frac{1}{n}\sum \text{Conf\_other} \qquad (11)$$

After the process of step S304 or after the process of step S306, in step S307, the reliability determination section 125 updates the reliability of the annotation result using the calculated reliability. In contrast, when the learning image has only an annotation result given by one user (No in step S302), the reliability is not updated and the reliability calculated in step S301 is used.

As described above, in a case where first to N-th (N is an integer of 2 or more) annotation results, which were input by a plurality of users, are associated with a given learning image, the processing section 120 first determines first to N-th reliability information based on the metadata assigned to each of the first to N-th annotation results (step S301). Thereafter, based on the first to N-th annotation results, an annotation result to be associated with the learning image is determined (steps S303 and S305). Then, based on the first to N-th reliability information, reliability information of the determined annotation result is determined (steps S304 and S306).

In this way, even when there are annotation results from a plurality of users for a single learning image, it is possible to determine an annotation result and reliability for a learning image on a one-to-one basis.

In addition, when the reliability represented by the reliability information is lower than a given reference value, the processing section 120 may perform a process of requesting re-input of the annotation result. The process of requesting re-input of the annotation result may be performed based on the individual reliability calculated in step S301, or based on the updated reliability obtained in step S307.

The reliability of step S301 may also be determined immediately after the completion of the annotation by the user. Therefore, the processing section 120 may request re-input of an annotation result by displaying the display image shown in FIG. 6 or the like again while the user continues to operate the annotation device 400 after the completion of annotation input by the user. Further, in a case where annotation and reliability determination are performed at different timings, re-input of annotation result may be performed using, for example, e-mail or the like. In this case, the process of requesting re-input of annotation result means a process of instructing a mail server (not shown) to send an e-mail.

Since annotation results from a plurality of users need to be used for the reliability in step S307, it is assumed that annotation and reliability determination are performed at different timings. Therefore, the process of requesting re-input of annotation result is executed, for example, as a process of instructing transmission of an e-mail.

3.4 Learning Using Reliability

First, an overview of general machine learning is described below. Machine learning using a neural network is described below. More specifically, the region-of-interest detector and the environment classifier described below are, for example, trained models trained by using a neural network. However, the method of the present embodiment is not limited to these models. In the present embodiment, machine learning using another model such as a support vector machine (SVM) may be performed, or machine learning using a method acquired by developing various methods such as a neural network and an SVM may be performed.

FIG. 11A is a schematic diagram describing a neural network. The neural network includes an input layer to which data is input, an intermediate layer for performing arithmetic operation based on an output from the input layer, and an output layer for outputting data based on an output from the intermediate layer. Although FIG. 11A illustrates an example using a network having two intermediate layers, it is possible to use a single intermediate layer or three or more intermediate layers. The number of nodes included in each layer is not limited to that in the example of FIG. 11A, and various modifications can be made. In view of accuracy, the learning of the present embodiment is preferably performed by deep learning using a multilayer neural network. The term "multilayer" used herein refers to four or more layers in the narrow sense.

As shown in FIG. 11A, a node included in a given layer is connected to a node of an adjacent layer. A weighting factor is set tier each connection. Each node multiplies the output of the node of the preceding stage by the weighting factor, thereby obtaining the sum of the multiplication results. Each node further determines the output of the node by adding a bias to the sum and applying an activation function to the addition result. By executing this process sequentially from the input layer to the output layer, the output of the neural network is obtained. Various functions such as Sigmoid function or ReLU function are known as the activation function. They may be widely used in the present embodiment.

Learning in a neural network is a process of determining an appropriate weighting factor. The weighting factor used herein includes a bias. Specifically, the learning device 600 enters input data of the teacher data to a neural network, and performs a forward calculation using the weighting factor at that time to determine an output. The learning device 600 calculates an objective function representing an error between the output and correct answer data of the teacher data. Then, the learning device 600 updates the weighting factor to minimize the objective function. To update the weighting factor, an error back-propagation method can be used, in which the weighting factors are updated, for example, from the output layer toward the input layer.

The neural network may be, for example, a convolutional neural network (CNN). FIG. 11B is a schematic diagram describing CNN. CNN includes a pooling layer and a convolution layer for performing a convolution operation. The convolution layer is a layer for performing filtering. The pooling layer is a layer for performing a pooling operation for reducing the size in the vertical direction and the horizontal direction. The example shown in FIG. 11B is a network in which the output is determined by performing operations by the convolutional layer and the pooling layer multiple times and then performing an operation by the fully-connected layer. The fully-connected layer is a layer that performs an operation process in a case where all nodes of preceding layers are connected to a node of a given layer, which corresponds to the operation of each layer described above with reference to FIG. 11A. Although not shown in FIG. 11B, an operation process using an activation function is also performed in CNN. Various configurations of CNN have been known and they can be widely used in the present embodiment.

Also in the case of using CNN, the steps of processing are the same as those in FIG. 11A. Specifically, the learning device 600 enters input data of the teacher data to CNN, and performs filtering using filter characteristics at that time or a pooling operation to determine an output. An objective function representing an error between the output and the correct answer data is calculated, and the weighting factor including the filter characteristics is updated to minimize the objective function. The update of weighting factor for CNN may also be performed, for example, using an error back-propagation method.

An objective function in deep learning is generally represented by the following expression (12). In the expression (12), y represents a correct answer label in the teacher data, and f(x) represents an output of a neural network serving as a classifier.

$$\min(x,y)=|y-f(x)| \tag{12}$$

As an image classification process, a process of classifying the image into any of M classes is described below. M is an integer equal to or greater than 2. For example, in a case where the output layer of CNN is a known softmax layer, f(x), i.e., an output of the softmax layer is M items of probability data, each showing a probability that the classification result is class 1, a probability that the classification result is class 2, . . . , and a probability that the classification result is class M. On the other hand, in a case where the annotation result is label information indicating class i, the correct answer data is data in which the probability of class i is 1 and the probabilities of other classes are 0. For example, the learning device 600 calculates a differential absolute value fir each of the probability data of M classes, and determines a function that minimizes the sum as an objective function.

In the present embodiment, a learning process based on reliability is performed considering the variation in correct answer value due to the complexity of living body images. For example, as shown in the expression (13) below, the learning device 600 performs learning using w_conf, which is a weight based on the reliability, as the weight of the objective function.

$$\min(x,y)=w\_conf*|y-f(x)| \qquad (13)$$

When the reliability is 1, which is the maximum value, the above expression (13) is the same as the above expression (12). That is, the contribution of the target teacher data in updating weighting factors is the same degree as in general machine learning. In contrast, when the reliability decreases, the objective function in the above expression (13) becomes smaller than that in the above expression (12). That is, the influence of teacher data with low reliability is reduced. This enables efficient learning of correct data. Although w_conf itself is used herein as the reliability, there is no such limitation and w_conf may be a different value determined based on the reliability. For example, w_conf may be a value larger than 1.

Figure 12:
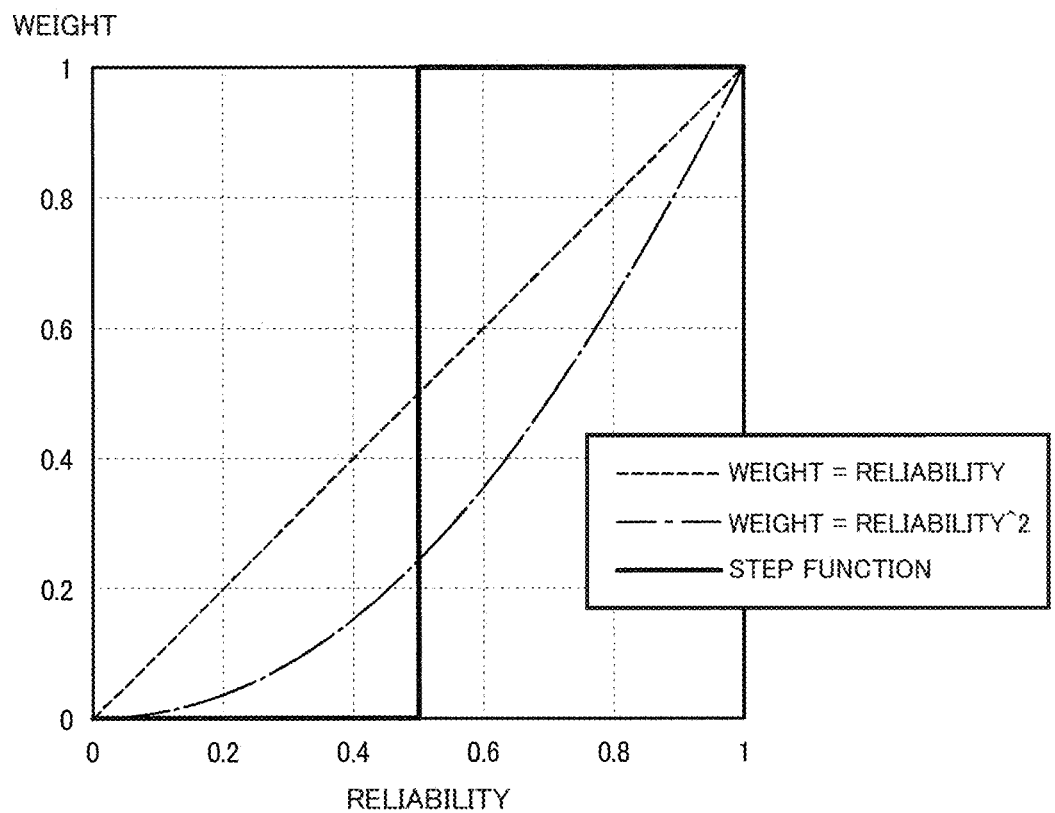
FIG. 12 is a diagram illustrating the relationship between reliability and weight information.

FIG. 12 is a diagram illustrating a relationship between reliability and w_conf, which is a weight based on the reliability. As described above, w_conf itself may be used as the reliability. Further, the processing section 120 may output, as the weight information, a value nonlinear to the reliability information. For example, as shown in FIG. 12, w_conf may be a power of the reliability. Although FIG. 12 shows an example in which w_conf is a square of the reliability, the index may be changed in various ways. Further, as shown in FIG. 12, w_conf may be determined based on a Step function. For example, w_conf is 0 when the reliability is equal to or less than a given threshold and w_conf is 1 when the reliability is greater than the given threshold. The given threshold is, for example, but not limited to, 0.5. w_conf may be any value determined based on the reliability, and the specific relationship can be changed in various ways.

Further, the learning device 600 may perform a learning process in which a weight different from w_conf is taken into account. For example, the learning device 600 updates the weighting factor based on the following expression (14), w_balance represents a weight in which the degree of class variation is taken into account. The class variation refers to, for example, the ratio of the number of learning images classified into class 1 to the number of learning images classified into class 2. This is the same also in a case with three or more classes. The class variation refers to variation in the number of learning images among the classes.

$$\min(x,y)=w\_balance*w\_conf*|y-f(x)| \qquad (14)$$

A learning process for generating a classifier for classifying an input image into either a "polyp" class, which is an image including a polyp, or a "normal" class, which is an image not including a polyp, is described below. For example, when the number of "normal" learning images is significantly larger than the number of "polyp" learning images, the objective function is likely to decrease if the input image is determined to be "normal". Accordingly, even an image of a polyp is more easily determined to be "normal", and the accuracy of classification using the classifier decreases, in this case, the influence of class variation can be suppressed by relatively increasing the weight of the learning image having a "polyp" label and relatively decreasing the weight of the learning image having a "normal" label. That is, by using the weight in which the variation between the classes is taken into account in addition to the weight based on the reliability, it is possible to further improve the accuracy of the learning.

The learning device 600 may update the weighting factor based on the following expression (15). w_object represents a weight based on a combination of the imaging environment in which the learning image is captured and an object captured in the region of interest.

$$\min(x,y)=w\_object*w\_conf*|y-f(x)| \qquad (15)$$

For example, in the case of "annotating a tumor in an endoscopic image obtained by capturing an upper digestive organ using special light for illumination", the user is less likely to be confused in the determination of the annotation because many such cases have been accumulated. Therefore, the weight w_object determined according to the imaging environment and the region of interest is set so that the influence of the weight w_conf based on the reliability becomes small.

On the other hand, in the case of "annotating a polyp in an endoscopic image obtained by capturing a lower digestive organ unstained using normal light for illumination", even a specialist may hesitate to make a determination due to a variety of situations and difficulty in viewing a lesion portion. In this case, the weight w_object determined according to the imaging environment and the region of interest is set so that the influence of the weight w_conf based on the reliability becomes large.

Further, the above expressions (14) and (15) may be combined. That is, the learning device 600 may perform learning in consideration of the weight w_conf based on the reliability, the weight w_balance due to the class variation, and the weight w_object based on the combination of the imaging environment and the object captured in the region of interest.

As described above, the processing section 120 outputs the learning image and the annotation result as the teacher data in the deep learning. Further, the processing section 120 outputs the reliability information as the weight information of the objective function in the deep learning. In this way, the contribution of the teacher data to the learning can be adjusted in consideration of the reliability, thereby generating a trained model with high accuracy of inference.

3.5 Inference

The processes in the inference device 700 after the trained model is generated by the learning process are the same as those in steps S105 to S107 in FIG. 4, which are the same as those when the reliability is not used. That is, the inference device 700 stores the trained model generated by the learning device 600. Further, the inference device 700 acquires an inference target image from the endoscope system 200 or an inference target database, and inputs the inference target image to the trained model. The processor included in the inference device 700 operates in accordance with instructions from the trained model, and thereby outputs an inference result for the inference target image. In the case of performing a classification process, the inference device 700 assigns a label representing the classification result to the inference target image. Further, the inference device 700 outputs the inference result. The output herein means, for example, a display process through a display section.

The operation performed by the processor of the inference device 700 in accordance with the trained model, that is, the operation for outputting output data based on the input data, may be performed by software or by hardware. In other words, the product-sum operation performed at each node in FIG. 11A, the filtering performed in the convolution layer of CNN, or the like may be performed by software. Alternatively, the above operation may be performed by a circuit device such as an FPGA. Further, the above operation may be performed by a combination of software and hardware. As described above, the operation of the processor in accordance with the instructions from the trained model can be performed in various ways. For example, the trained model includes an inference algorithm and parameters used in the inference algorithm. The inference algorithm is an algorithm that performs a filter operation or the like based on input data. The parameter is those acquired by the learning process, and examples thereof include a weighting factor. In this case, both the inference algorithm and the parameters may be stored in the memory of the inference device 700, allowing the processor to perform the inference process in a software manner by reading out the inference algorithm and the parameters. Alternatively, the inference algorithm may be implemented by an FPGA or the like, and the parameters may be stored in the memory. Otherwise, an inference algorithm including parameters may be implemented by an FPGA or the like. In this case, the memory storing the information of the trained model is, for example, a built-in memory of the FPGA.

3.6 Modifications

Although an example in which the trained model is a classifier that performs a process of classifying learning images has been mainly described above, the trained model may be a trained model for use in a detection task or a region dividing task. The detection task is a process of outputting the position of the region of interest and the degree of certainty thereof. For example, in the case of a detection task for detecting a polyp, the trained model outputs information indicating the position of the polyp in the inference target image, as well as the degree of certainty that the object at the position is the polyp. The region dividing task is a process of dividing the learning image into a plurality of regions by classifying the object captured at the pixel on the pixel basis. For example, when the inference target image is divided into a polyp region and other regions, the trained model outputs, for each pixel, the degree of certainty that the pixel is a polyp.

When the trained model fix performing the detection task is generated, the reliability determination section 125 determines reliability for each detection target. For example, when a plurality of regions of interest exists in one learning image, the user gives an annotation result for specifying each region of interest. That is, the annotation processing section 121 acquires as many annotation results as the number of regions of interest to be detection targets for one learning image.

The metadata acquisition section 123 acquires metadata for determining reliability of each annotation result. For example, the metadata acquisition section 123 calculates the identifiability information and the shielded degree information for each annotation result. The metadata acquisition section 123 may also determine a common image quality information for a plurality of annotation results, or determine image quality information for a given region that includes the detection frame, thereby determining image quality information for each annotation result.

In addition, the metadata acquisition section 123 sets the time from the display of the learning image to the input of the first annotation result as the operation time information of the first annotation result and sets the time from the input of the first annotation result to the input of the second annotation result as the operation time information of the second annotation result, thereby calculating the operation time information for each annotation result. However, the metadata acquisition section 123 may determine common operation time information for a plurality of annotation results.

It may also be assumed that the metadata acquisition section 123 determines fatigue level information and proficiency level information common for a plurality of annotation results. However, capability information may be determined for each annotation result, for example, by sequentially measuring living body information, The reliability determination section 125 determines reliability for each detection target based on the metadata. The processes shown in steps S302 to S307 of FIG. 10 are also executed for each detection target. For example, in step S303, the reliability determination section 125 determines whether a plurality of detection frames is sufficiently close, thereby determining whether the annotation results from a plurality of users were made for the same detection target. For example, the reliability determination section 125 determines an overlapping degree of a plurality of detection frames, and determines that a plurality of annotation results coincides with each other when the overlapping degree is equal to or greater than a predetermined threshold. This makes it possible to integrate a plurality of annotation results and reliabilities assigned to a single detection target. The image processing system 100 outputs, for one learning image, annotation results corresponding to the number of detection targets included in the learning image and reliability information indicating the reliability of each annotation result.

The objective function in the learning for the detection task is expressed by the sum of a term representing the position of the object and a term representing the degree of certainty of the object. When the weight based on the reliability information in each detection target is expressed as w_j_conf, the learning device 600 uses the weight w_j_conf as the weight information of the objective function. Specifically, the learning device 600 updates the weighting factor based on the following expression (16). The first term in the following expression (16) corresponds to information obtained by multiplying the differential absolute value between the model output and the correct answer data regarding the position of the detection frame by the weight w_j_conf. The second term in the following expression (16) corresponds to information obtained by multiplying the differential absolute value between the model output and the correct answer data regarding the degree of certainty of the object captured in the detection frame by the weight w_j_conf.

[Math. 2]

$$\min(x, y) = \sum_i \sum_j w\_j\_conf \left\| y_{i_{xywh}} - f(x_i)_{xywh} \right\| + \sum_i \sum_j w\_j\_conf \left\| y_{i_{objectness}} - f(x_i)_{objectness} \right\| \quad (16)$$

Further, in a case where a trained model that performs a region dividing task is generated, the metadata may include metadata that can be calculated on the pixel basis and metadata that is shared by the entire image. For example, the image quality information can be calculated on the pixel basis by setting a given region including the target pixel to be processed and performing processing for each region.

The reliability determination section 125 determines reliability for each pixel based on the metadata. The processes shown in steps S302 to S307 of FIG. 10 are also executed for each target pixel.

When the weight based on the reliability information in the pixel (i,j) is expressed as w_ij_conf, the learning device 600 uses the weight w_ij_conf as the weight information of the objective function. The pixel (i,j) represents the pixel i-th in the horizontal direction and j-th in the vertical direction with respect to the reference point of the inference target image. Specifically, the learning device 600 updates the weighting factor based on the following expression (17). In the following expression (17), represents correct answer data in the pixel (i,j), and f($x_{ij}$) represents a model output in the pixel (i,j).

[Math. 3]

$$\min(x, y) = \sum_i \sum_j w\_ij\_conf \| y_{ij} - f(x_{ij}) \| \quad (17)$$

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. An image processing system comprising:
a processor including hardware, wherein the processor is configured to:
receive an annotation result, inputted through an interface, on a learning image captured inside a living body;
acquire metadata including difficulty information indicating difficulty of annotating the learning image;
determine reliability information indicating reliability of the annotation result based on the metadata; and
output, as data used in generating a trained model used in inference based on deep learning on an inference target image captured inside a living body, a dataset in which the learning image, the annotation result, and the reliability information are associated with each other.

2. The image processing system as defined in claim 1, wherein the processor is configured to perform image processing on the learning image to acquire the difficulty information.

3. The image processing system as defined in claim 2, wherein the processor is configured to determine, by the image processing, at least one of information indicating identifiability of an annotation target in the learning image, information indicating image quality of the learning image, and information indicating a shielded degree of the annotation target in the learning image, and acquire the difficulty information.

4. The image processing system as defined in claim 3, wherein the processor is configured to determine that the lower the identifiability, the higher the difficulty.

5. The image processing system as defined in claim 3, wherein the processor is configured to determine that the lower the image quality, the higher the difficulty.

6. The image processing system as defined in claim 3, wherein the processor is configured to determine that the higher the shielded degree, the higher the difficulty.

7. The image processing system as defined in claim 1, wherein:
the difficulty information includes operation time information indicating time required to give the annotation result on the learning image; and
the processor is configured to determine that the difficulty is high when operation time indicated by the operation time information is longer than a predetermined time.

8. The image processing system as defined in claim 1, wherein:
the metadata includes capability information indicating capability of a user who inputs the annotation result using the interface; and
the processor is configured to determine the reliability information based on the difficulty information and the capability information.

9. The image processing system as defined in claim 8, wherein the capability information includes fatigue level information indicating a fatigue level of the user.

10. The image processing system as defined in claim 8, wherein the capability information includes proficiency level information indicating a proficiency level of the user.

11. The image processing system as defined in claim 1, wherein:
the interface accepts, as the metadata, self-assessment information indicating self-assessment of a user who has input the annotation result; and
the processor is configured to determine the reliability information based on the metadata including the self-assessment information.

12. The image processing system as defined in claim 1, wherein, in a case where a first to N-th (N is an integer of 2 or more) annotation results, which were input by a plurality of users, are associated with an arbitrary one of the learning image, the processor is configured to:

determine first to N-th reliability information based on the metadata assigned to each of the first to N-th annotation results; and determine the annotation result to be associated with the learning image based on the first to N-th annotation results, and determine the reliability information of the determined annotation result based on the first to N-th reliability information.

13. The image processing system as defined in claim 1, wherein:

the interface includes a display that displays a display image including the learning image; and the processor is configured to control the display to display the metadata in the display image.

14. The image processing system as defined in claim 1, wherein the processor is configured to:

output the learning image and the annotation result as teacher data for the deep learning; and output the reliability information as weight information of an objective function in the deep learning.

15. The image processing system as defined in claim 1, wherein the processor is configured to:

output the learning image and the annotation result as teacher data for the deep learning; and output, as weight information of an objective function in the deep learning, a value nonlinear to the reliability information.

16. The image processing system as defined in claim 1, wherein the processor is configured to perform a process of requesting re-input of the annotation result when the reliability indicated by the reliability information is lower than a given reference value.

17. An image processing device comprising:

a processor including hardware, wherein the processor is configured to:

receive input of an annotation result on a learning image captured inside a living body;

acquire metadata including difficulty information indicating difficulty of annotating the learning image; and output the acquired metadata as information for determining reliability of the annotation result in association with the learning image, wherein the learning image and the annotation result are used in generating a trained model used in inference based on deep learning on an inference target image captured inside a living body, and the reliability being used as weight information of an objective function in the deep learning.

18. An interface comprising:

an input section configured to receive input of an annotation result on a learning image captured inside a living body, wherein:

the interface is connected to a processor including hardware;

the interface is configured to input, to the processor, metadata including difficulty information indicating difficulty of annotating the learning image;

the processor determines reliability information indicating reliability of the annotation result based on the metadata; and the processor outputs, as data used in generating a trained model used in inference based on deep learning on an inference target image captured inside a living body, a dataset in which the learning image, the annotation result, and the reliability information are associated with each other.

19. An image processing method comprising acquiring an annotation result on a learning image captured inside a living body;

acquiring metadata including difficulty information indicating difficulty of annotating of the learning image;

determining reliability information indicating reliability of the annotation result based on the metadata; and outputting, as data used in generating a trained model used in inference based on deep learning on an inference target image captured inside a living body, a dataset in which the learning image, the annotation result, and the reliability information are associated with each other.

20. A non-transitory information storage medium storing a program, the program causing a computer to at least execute:

acquiring an annotation result on a learning image captured inside a living body;

acquiring metadata including difficulty information indicating difficulty of annotating the learning image;

determining reliability information indicating reliability of the annotation result based on the metadata; and outputting, as data used in generating a trained model used in inference based on deep learning on an inference target image captured inside a living body, a dataset in which the learning image, the annotation result, and the reliability information are associated with each other.

* * * * *